(12) United States Patent
Bliss et al.

(10) Patent No.: US 11,465,308 B2
(45) Date of Patent: Oct. 11, 2022

(54) TRACK-ALIGNED PROCESS TOOLS AND PROCESS OF USING

(71) Applicant: The Boeing Company, Chicago, IL (US)

(72) Inventors: Megan E. Bliss, Des Moines, WA (US); Hien Thuong Bui, Renton, WA (US); Derek L. Mickelson, Everett, WA (US); Kealii M. Ribao, Everett, WA (US); Florante M. Halili, Renton, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 16/867,454

(22) Filed: May 5, 2020

(65) Prior Publication Data

US 2021/0347080 A1 Nov. 11, 2021

(51) Int. Cl.
| | |
|---|---|
| *B26D 1/60* | (2006.01) |
| *B26D 1/18* | (2006.01) |
| *B23D 45/02* | (2006.01) |
| *B23D 47/02* | (2006.01) |
| *B23Q 9/00* | (2006.01) |
| *B23D 45/00* | (2006.01) |
| *B26D 5/00* | (2006.01) |

(52) U.S. Cl.
CPC ............ *B26D 1/60* (2013.01); *B23D 45/003* (2013.01); *B23D 45/021* (2013.01); *B23D 47/02* (2013.01); *B23Q 9/005* (2013.01); *B23Q 9/0007* (2013.01); *B23Q 9/0042* (2013.01); *B26D 1/18* (2013.01); *B26D 5/00* (2013.01); *Y10T 83/68* (2015.04)

(58) Field of Classification Search
CPC . B26D 1/18; B26D 1/185; B26D 1/60; B26D 7/2628; B26D 7/2635; B26D 2007/2657; B26D 2007/2685; B23Q 9/0007; B23Q 1/25; B23Q 1/26; B23Q 9/0014; B23Q 9/0042; B23Q 9/005; B21J 158/142; B23D 45/021; B23D 45/027; B23D 47/02
See application file for complete search history.

(56) References Cited

U.S. PATENT DOCUMENTS

| | | | | |
|---|---|---|---|---|
| 5,848,930 | A * | 12/1998 | Jones ..................... | B23D 47/02 451/237 |
| 6,843,328 | B2 | 1/2005 | Boyl-Davis et al. | |
| 2010/0122444 | A1 * | 5/2010 | Reid et al. ............. | B21J 15/142 29/243.54 |
| 2012/0014759 | A1 * | 1/2012 | Sarh et al. ........... | B23Q 9/0007 408/76 |

* cited by examiner

*Primary Examiner* — Clark F Dexter
(74) *Attorney, Agent, or Firm* — Duft & Bornsen, PC

(57) ABSTRACT

During an assembly process for an aircraft, segments of the fuselage are fabricated separately prior to joining the segments together to form the complete fuselage. In order to ensure that abutting ends of the segments mate together correctly, a machining process is performed along the edges of the segments at their ends. A trim-tool assembly includes an indexing cart mounted to a track secured to a surface of the workpiece, where a setting on the indexing cart varies a distance between a centerline of the track and an edge of a workpiece. The trim-tool assembly further includes a tool cart mounted to the track and translatable along the track. The tool cart includes a process tool that performs a machining process on the workpiece at a fixed distance from the centerline of the track.

20 Claims, 24 Drawing Sheets

TRACK-ALIGNED PROCESS TOOLS AND PROCESS OF USING

FIELD

This disclosure relates to the field of manufacturing, and in particular, to machining processes performed on a fuselage during aircraft manufacturing.

BACKGROUND

During a fuselage assembly process for an aircraft, different segments of the fuselage are fabricated separately and then joined together to form the complete fuselage. When joining the ends of the segments together, a trim process is performed on the skin panels on the ends to ensure that adjacent segments of the fuselage mate to each other correctly.

Typically, this process is performed manually by workers using hand grinders, which entails a lengthy set up time and processing time to complete the work. Further, since the process is performed by hand, errors may occur in the accuracy of the trim process. Further, the manual nature of the work places a high amount of ergonomic stress on the workers. Thus, it is desirable to improve the trim process performed on the ends of the segments to improve the accuracy, reliability, and reduce the time spent when joining adjacent segments of the fuselage together.

SUMMARY

During an assembly process for an aircraft, segments of the fuselage are fabricated separately prior to joining the segments together to form the complete fuselage. In order to ensure that abutting ends of the segments mate together correctly, a flexible track assembly is mounted to an outer surface of the fuselage segment near the end of the fuselage segment. The flexible track assembly includes a track and a plurality of vacuum grippers that attach to the outer surface of the fuselage. A pair of indexing carts are loaded on the track towards each end of the track, and are adjusted to align a centerline of the track with the edge of the fuselage segment at the end. The indexing carts define a processing line proximate to the edge of the fuselage segment. A tool cart is loaded onto the track, which includes a process tool such as a trim saw. The trim saw is oriented on the tool cart such that the blade of the trim saw follows the process line across the fuselage segment generated by the indexing carts. As the tool cart translates along the track between the ends of the track, the trim saw removes material at the end of the fuselage segment. The use of the indexing carts, the tool cart, and the flexible track assembly improves the manufacturing process by eliminating the manual fabrication process previously performed when assembling the fuselage, reducing manufacturing time, worker effort, and improving the accuracy of the process.

One embodiment comprises a method of operating a trim-tool assembly. The method comprises installing a track proximate to a surface of a workpiece, aligning the track to an edge of the workpiece using indexing carts, where variable settings on the indexing carts define a process line that intersects the workpiece proximate to the edge between each end of the track. The method further comprises translating the tool cart along the track to perform the machining process along the process line.

Another embodiment comprises a trim-tool assembly disposed proximate to a surface of a workpiece, and a pair of indexing carts. The pair of indexing carts are disposed towards ends of the track and align the track to an edge of the workpiece. Variable settings on the pair of indexing carts define a process line that intersects the workpiece proximate to the edge between the ends of the track. A tool cart is disposed on the track and includes a process tool that performs a machining process along the process line based on the variable settings on the indexing carts as the tool cart translates along the track.

Another embodiment comprises a trim-tool assembly for machining proximate to an edge of a workpiece. The trim-tool assembly includes an indexing cart configured to mount to a track secured to a surface of the workpiece, where a setting on the indexing cart varies a distance between a centerline of the track and the edge of the workpiece. The trim-tool assembly further includes a tool cart configured to mount to and translate along the track, where the tool cart includes a process tool that performs a machining process on the workpiece at a fixed distance from the centerline of the track.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
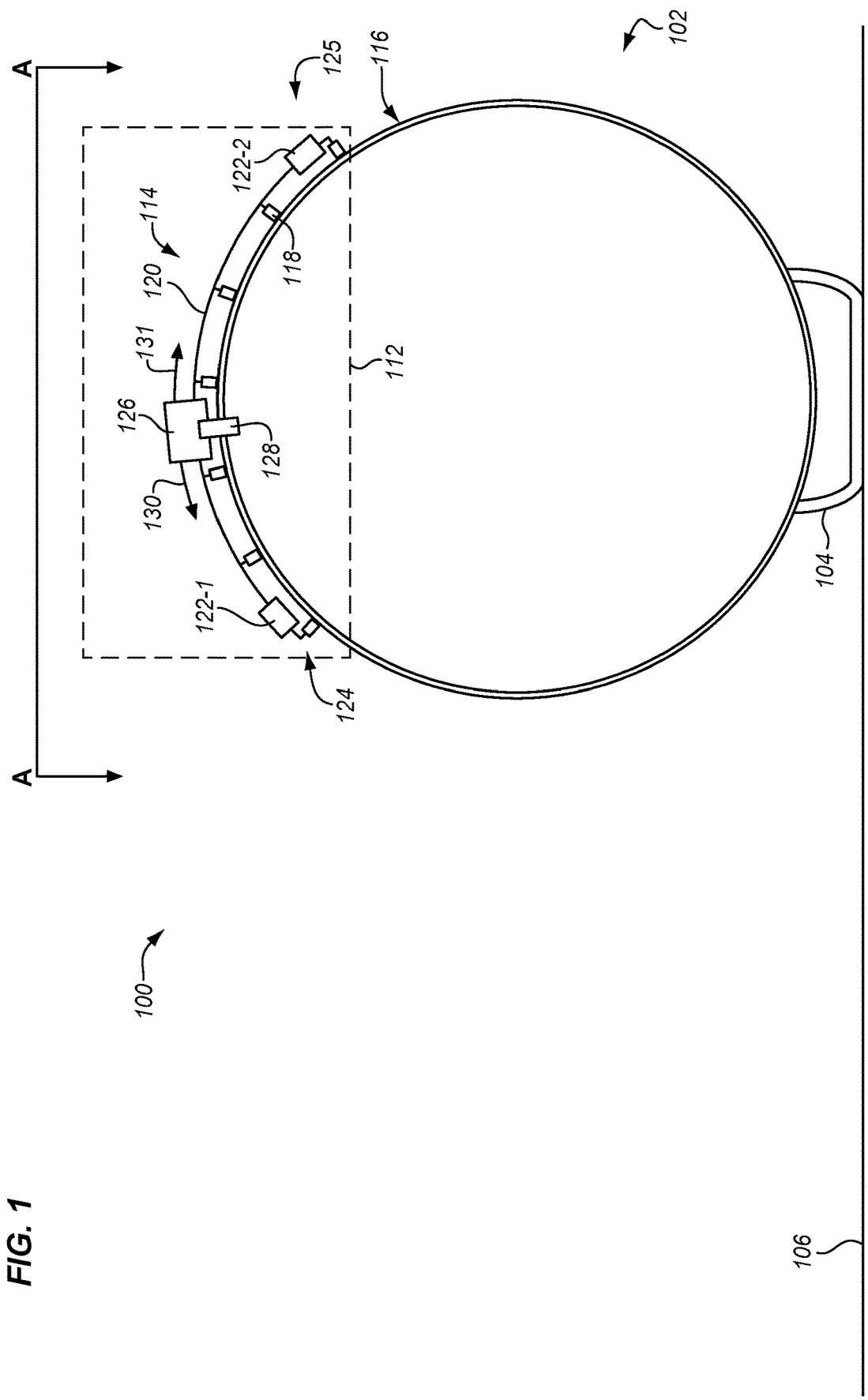
FIGS. 1-2 depict a manufacturing environment in an illustrative embodiment.
Figure 2:
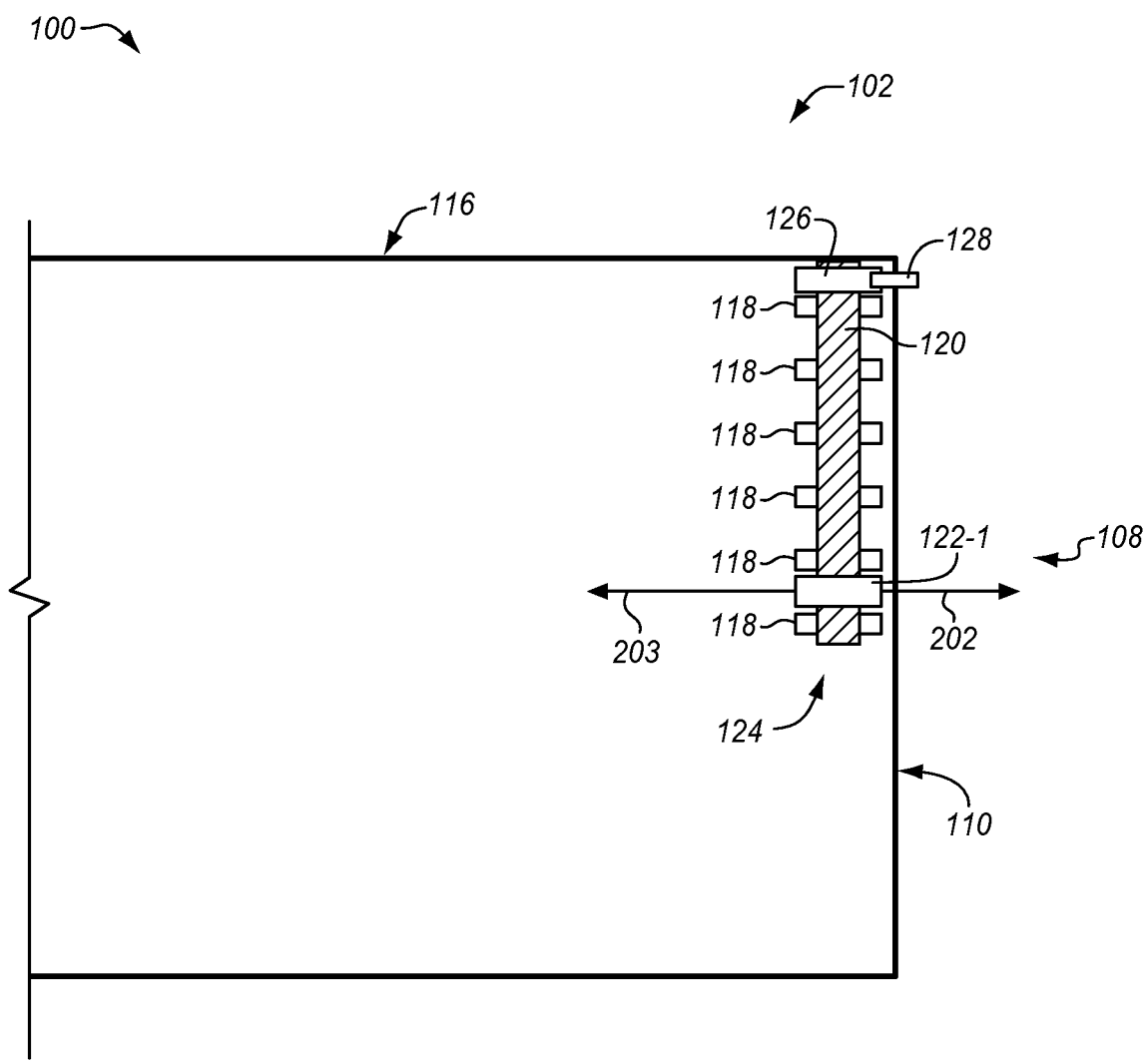

FIGS. 1-2 depict a manufacturing environment 100 in an illustrative embodiment. In some embodiments, manufacturing environment 100 may comprise an aircraft manufacturing environment. However, manufacturing environment 100 may comprises other types of environments in different embodiments.

In FIG. 1, a fuselage segment 102 (e.g., one segment of a number of segments that make up a complete fuselage) is supported by a fixture 104 on a shop floor 106. FIG. 2 depicts fuselage segment 102 along view lines A-A of FIG. 1. During a skin trim process on an end 108 of fuselage segment 102, material is removed from the skin panels at end 108 to ensure that end 108 mates correctly with other segments of the fuselage (not shown). In particular, material is removed from an edge 110 of fuselage segment 102 at end 108, with edge 110 representing where skin panels that form an outer surface 116 of fuselage segment 102 terminate at end 108 of fuselage segment 102.

In the embodiments described herein, this process is performed using a trim-tool assembly 112, which is aligned along edge 110 of fuselage segment 102 to allow a machining operation to be performed proximate to end 108 (e.g., a cutting operation which removes material from end 108 proximate to edge 110). Although trim-tool assembly 112 will be described for use specifically for segments of a fuselage for aircraft, trim-tool assembly 112 may be utilized on any curved or flat workpiece as a matter of choice. Thus, trim-tool assembly 112 is not specifically limited for use on fuselage segment 102. In this regard, fuselage segment 102 may be referred to as a workpiece in some embodiments.

In this embodiment, trim-tool assembly 112 includes a flexible track assembly 114, which conforms to outer surface 116 around a portion of the circumference of fuselage segment 102. In particular, flexible track assembly 114 includes a plurality of vacuum grippers 118 that vertically support a track 120. The vacuum grippers 118 removably adhere to outer surface 116 of fuselage segment 102 using a vacuum source (not shown). The vacuum source draws a vacuum between contact surfaces of vacuum grippers 118 and outer surface 116 of fuselage segment 102.

In this embodiment, trim-tool assembly 112 includes a pair of indexing carts 122; one at each of ends 124-125 of flexible track assembly 114. However, indexing carts 122 may be located at any spaced-apart position along flexible track assembly 114 in other embodiments.

Trim-tool assembly 112 further includes a tool cart 126 that rides along track 120 between ends 124-125 in the direction of arrows 130-131. Tool cart 126 includes one or more process tools 128 that perform a machining process on end 108 of fuselage segment 102 (e.g., a cutting process, a polishing process, a de-burr process, etc.). For instance, process tool 128 may comprise a trim saw, which removes material from end 108 of fuselage segment 102 based on settings applied to indexing carts 122. In particular, the settings on indexing carts 122 modify the position of track 120 relative to edge 110 (e.g., indexing carts 122 modify a distance between a centerline of track 120 and edge 110), which in turn, modifies the width of material removed from edge 110 by process tool 128 (if process tool 128 is a trim saw) as tool cart 126 translates between ends 124-125 of track 120. For example, indexing carts 122 may be used to move track 120 closer or farther away from edge 110 (e.g., out of the page or into the page in FIG. 1) prior to securing flexible track assembly 114 to outer surface 116 of fuselage segment 102 upon the application of the vacuum source to vacuum grippers 118. Indexing carts 122 may be removed from track 120 once flexible track assembly 114 is secured to outer surface 116 of fuselage segment 102. Further, although only two indexing carts 122 are illustrated in FIGS. 1-2, trim-tool assembly 112 may utilize fewer or more indexing carts 122 during an alignment process of track 120 to edge 110 as a matter of design choice.

In some embodiments, flexible track assembly 114 is flexible along a bending axis, and rigid or semi-rigid in an axis that is orthogonal to the bending axis. For example, flexible track assembly 114 is flexible in a bending axis that is normal to outer surface 116 (as illustrated in FIG. 1) around the portion of the circumference of fuselage segment 102, and rigid or semi-rigid in an axis that is parallel to outer surface 116 (e.g., in the direction of arrows 202-203 in FIG. 2).

In order to perform a precise machining operation on end 108 of fuselage segment 102, track 120 is first aligned to edge 110 using indexing carts 122 disposed towards ends 124-125. For example, indexing cart 122-1 may be attached to track 120 proximate to end 124, and adjusted to position track 120 relative to edge 110 at end 124. In a similar manner, indexing cart 122-2 may be attached to track 120 proximate to end 125, and is adjusted to position track 120 relative to edge 110 at end 125. In other embodiments, indexing carts 122 may be located at any spaced-apart position along a length of track 120 as a matter of design choice.

The adjustments or settings applied to indexing carts 122 to position track 120 relative to edge 110 at ends 124-125 may be the same or different adjustments. Based on the adjustments made to indexing carts 122, a process line is formed between ends 124-125 of track 120, which intersects fuselage segment 102 proximate to edge 110. Flexible track assembly 114 may then be secured to outer surface 116 of fuselage segment 102 by applying a vacuum to vacuum grippers 118 in order to prevent the movement of track 120 relative to edge 110. Indexing carts 122 may then be removed from track 120, if desired.

With flexible track assembly 114 secured in place, tool cart 126 is loaded onto track 120. As tool cart 126 translates between ends 124-125 of track 120, process tool 128 performs a machining operation on the process line set in place by the adjustments to indexing carts 122. This process line intersects fuselage segment 102 between ends 124-125 of track 120, and material is removed from end 108 of fuselage segment 102. The amount of material removed proximate to ends 124-125 depends on the settings applied to indexing carts 122, with a variable amount of material removed between ends 124-125 that depends on the shape and distance between edge 110 and the process line (e.g., edge may not be a constant distance from the process line between ends 124-125).

For example, indexing carts 122 may each be set to fifteen thousands of an inch, which places the process line fifteen thousands of an inch from edge 110 at each of indexing carts 122. As discussed above, the amount of material removed between indexing carts 122 along the process line depends on the shape of edge 110 between indexing carts 122.

In another example, indexing carts 122 may be set to different amounts (e.g., indexing cart 122-1 may be set to five thousands of an inch, while indexing cart 122-2 may be set to fifteen thousands of an inch, which places the process line five thousands of an inch from edge 110 at indexing cart 122-1, and fifteen thousands of an inch at indexing cart 122-2, with the process line removing a variable amount of material from end 108 of fuselage segment 102 between indexing carts 122 that depends on the shape and distance of edge 110 from the process line.

Since flexible track assembly 114 is rigid or semi-rigid in the direction of arrows 202-203 (i.e., orthogonal to the bending axis), adjustments in the displacement of track 120 relative to edge 110 are reflected along the length of track 120, which extends partially around the circumference of fuselage segment 102.

Trim-tool assembly 112 therefore provides a technical benefit of ensuring that machining operations performed on end 108 of fuselage segment 102 are performed accurately and safely. Further, the use of trim-tool assembly 112 obviates the manual process previously performed on end 108 of fuselage segment 102 during an aircraft manufacturing process to ensure that edge 110 of fuselage segment 102 correctly mates to the ends of adjacent fuselage segments that collectively form the fuselage for the aircraft.

Figure 3:
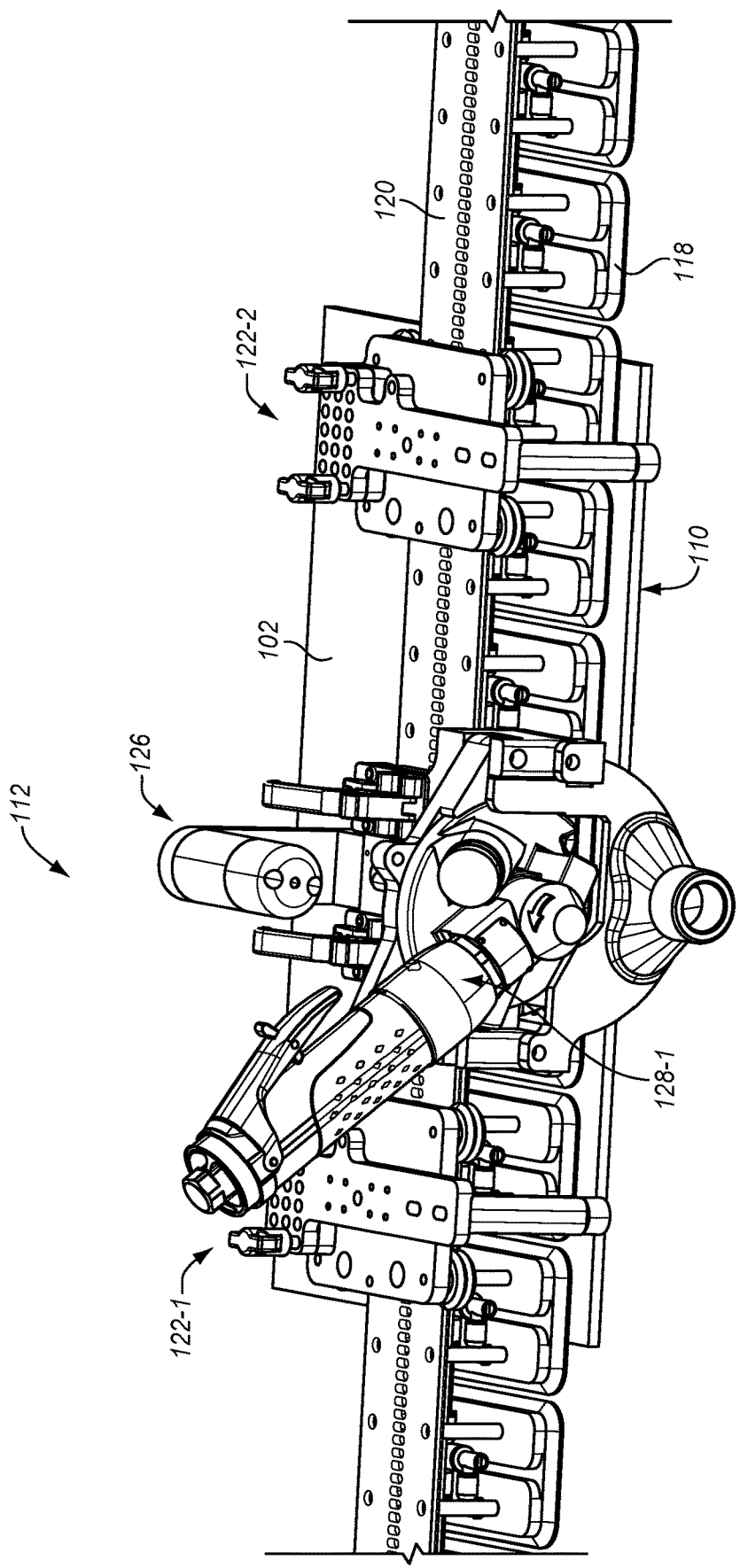
FIG. 3 is an isometric view of a trim-tool assembly in an illustrative embodiment.

FIG. 3 is an isometric view of trim-tool assembly 112 in an illustrative embodiment. In this embodiment, tool cart 126 is loaded on track 120, and is disposed between indexing cart 122-1 and indexing cart 122-2, each of which are also loaded onto track 120. Typically, indexing carts 122 would be disposed towards ends 124-125, but they are centrally located in FIG. 3 for purposes of discussion.

In this embodiment, process tool 128 of tool cart 126 is depicted as a trim saw 128-1, although process tool 128 may comprise other types of tools in different embodiments. Also illustrated in FIG. 3 is a portion of fuselage segment 102, with edge 110 proximate to trim saw 128-1.

Figure 4:
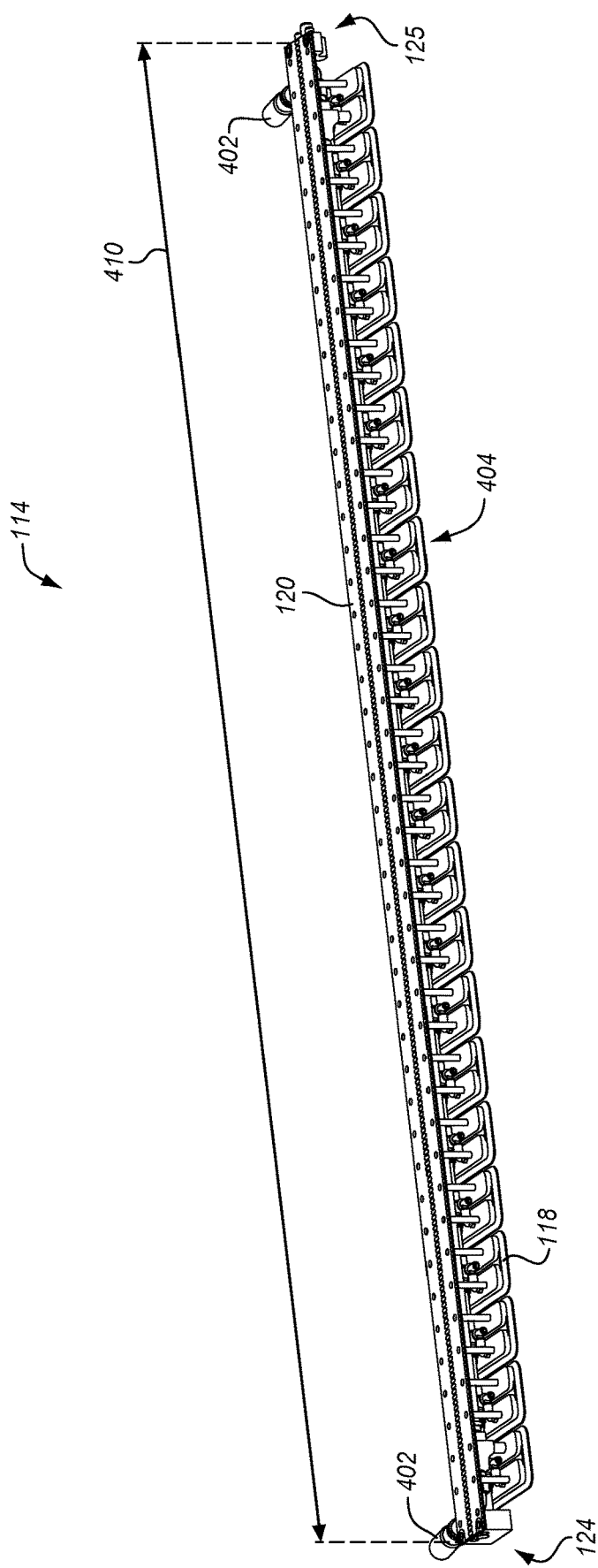
FIGS. 4-6 are isometrics views of a flexible track assembly in an illustrative embodiment.
Figure 5:
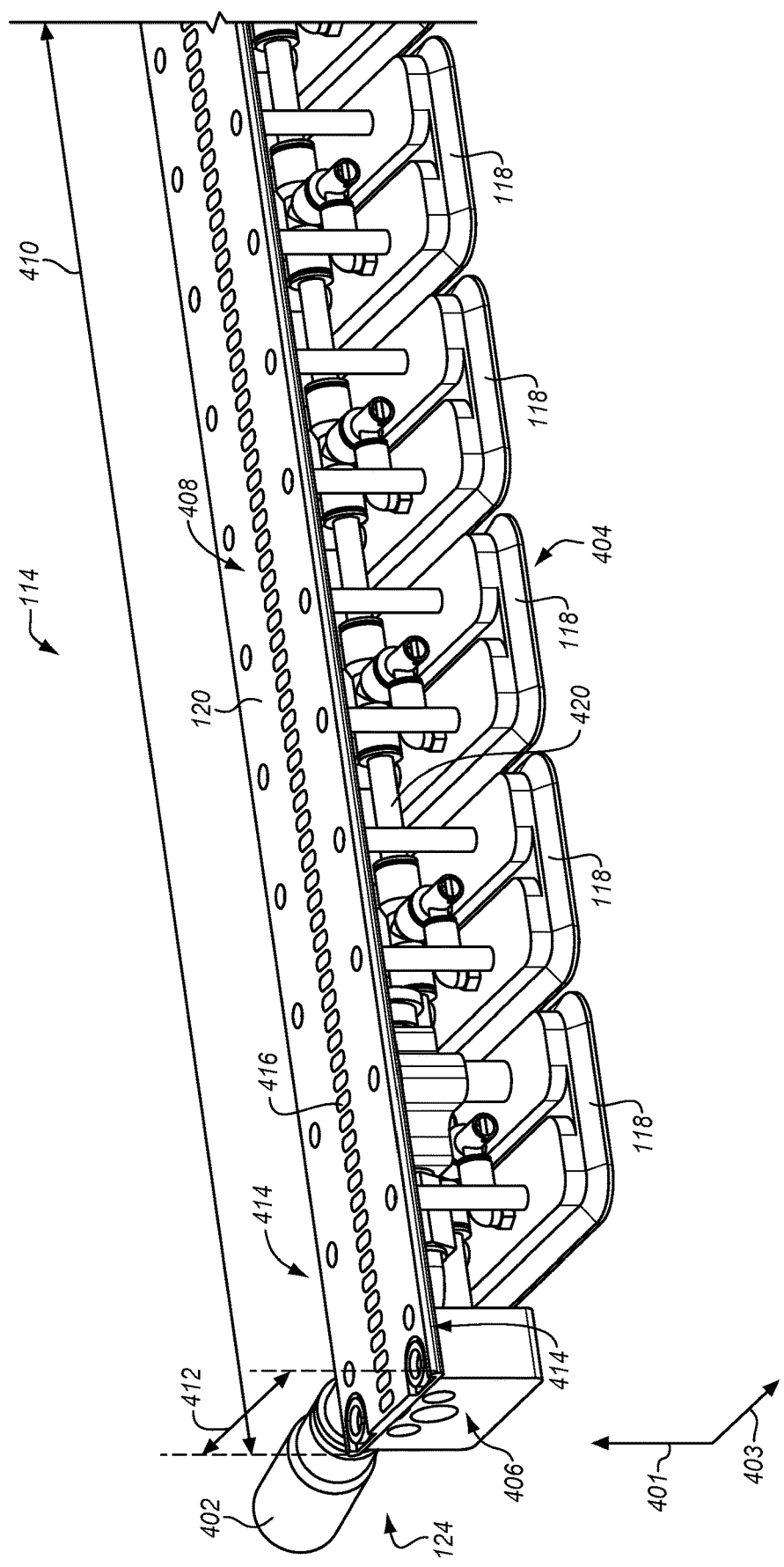
Figure 6:
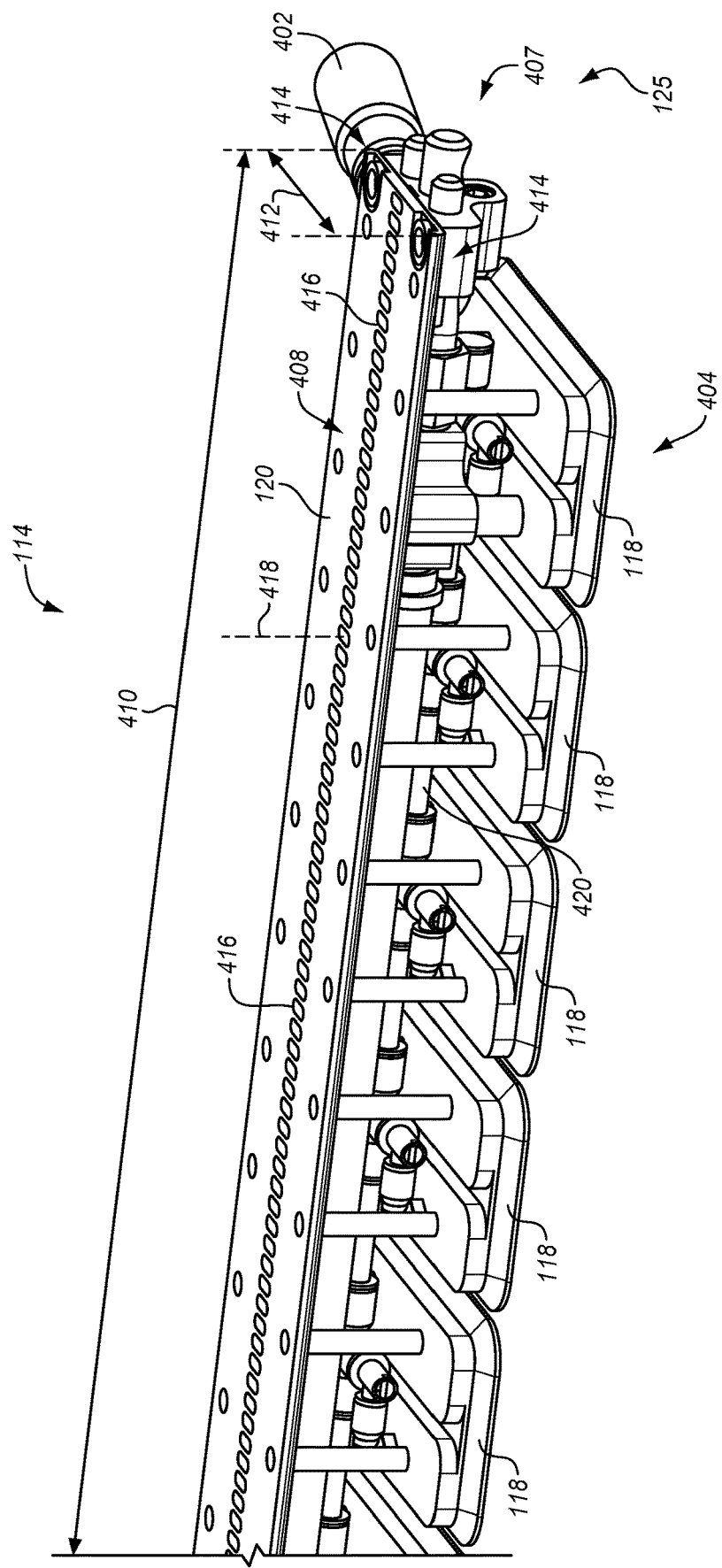
Figure 7:
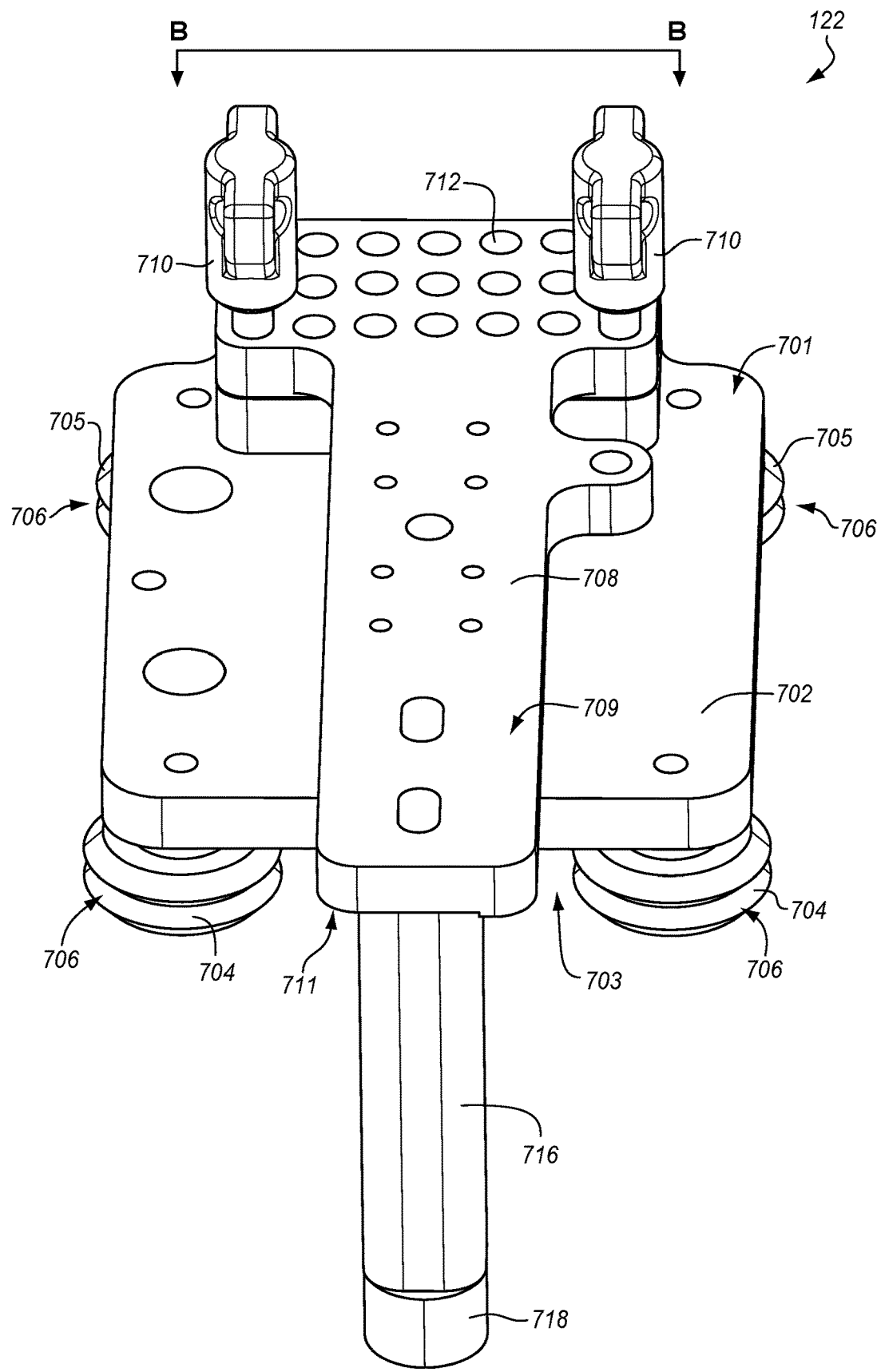
FIGS. 7-10 are isometric views of an indexing cart in an illustrative embodiment.

FIGS. 4-6 are isometrics views of flexible track assembly 114 in an illustrative embodiment. In this embodiment, flexible track assembly 114 includes vacuum grippers 118, which conform to and removably adhere to outer surface 116 of fuselage segment 102 along a portion of its circumference. A vacuum source (not shown) is coupled to vacuum ports 402, which applies a vacuum to a contact surface 404 of vacuum grippers 118, allowing contact surface 404 of vacuum grippers 118 to adhere to outer surface 116 of fuselage segment 102. Flexible track assembly 114 includes a vacuum distribution manifold 420 in fluid communication with vacuum ports 402 and vacuum grippers 118, which is used to distribute a vacuum to vacuum grippers 118.

In FIGS. 5-6, flexible track assembly 114 includes couplers 406-407 at ends 124-125, respectively, which allows track 120 to be extended as desired by coupling an arbitrary number of flexible track assemblies 114 together along a total desired length. Couplers 406-407 also are used to provide a vacuum communication path between adjacently connected flexible track assemblies 114.

Coupler 406 in this embodiment is a female coupler, while coupler 407 is a male coupler. Track 120 in this embodiment includes a top surface 408 that is planar, and has a length 410 and a width 412. Track 120 further includes outside edges 414 that are separated by width 412 of track 120. Outside edges 414 of track 120 support and guide indexing carts 122 and tool cart 126 as they translate along track 120 between ends 124-125. This will be discussed later. Further as described previously, flexible track assembly 114 is flexible in a bending axis 401 that is normal to top surface 408, and is semi-flexible or rigid in an axis 403 that is orthogonal to bending axis 401. Centered between edges 414 of track is a track centerline 418, which will be discussed later with respect to how indexing carts 122 align track 120 to edge 110, and how this alignment allows tool cart 126 to properly position process tool 128 relative to edge 110 for machining operations.

In some embodiments, track 120 includes gear guides 416, which couple a drive gear on tool cart 126 to track 120, allowing the drive gear on tool cart 126 to power tool cart 126 along track 120. In this embodiment, gear guides 416 are depicted as cut-outs in top surface 408, although gear guides 416 may be implemented using projections from top surface 408 (e.g., gear guides 416 formed from teeth projecting away from top surface 408) or other surface features on track 120.

Figure 8:
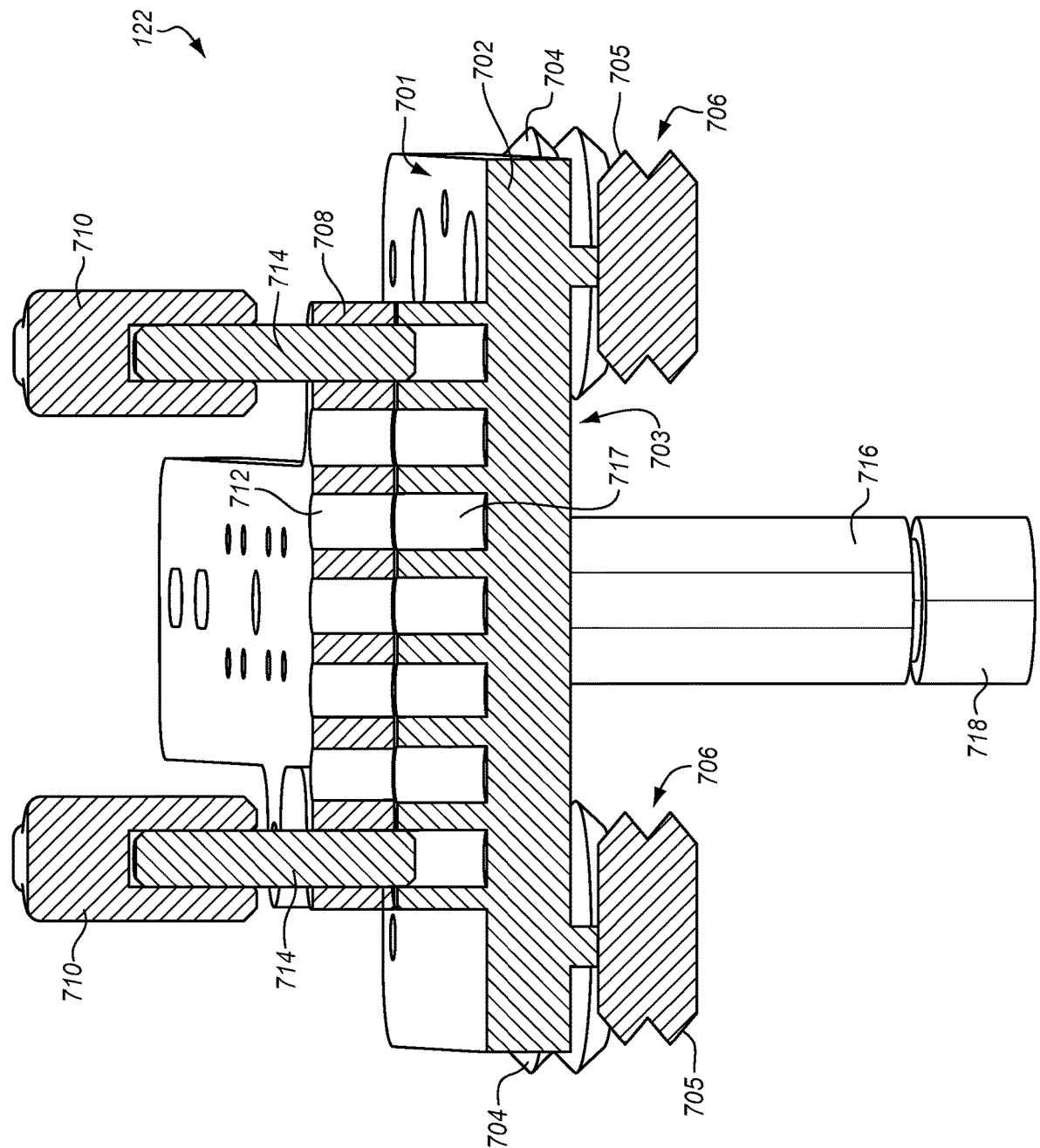
Figure 9:
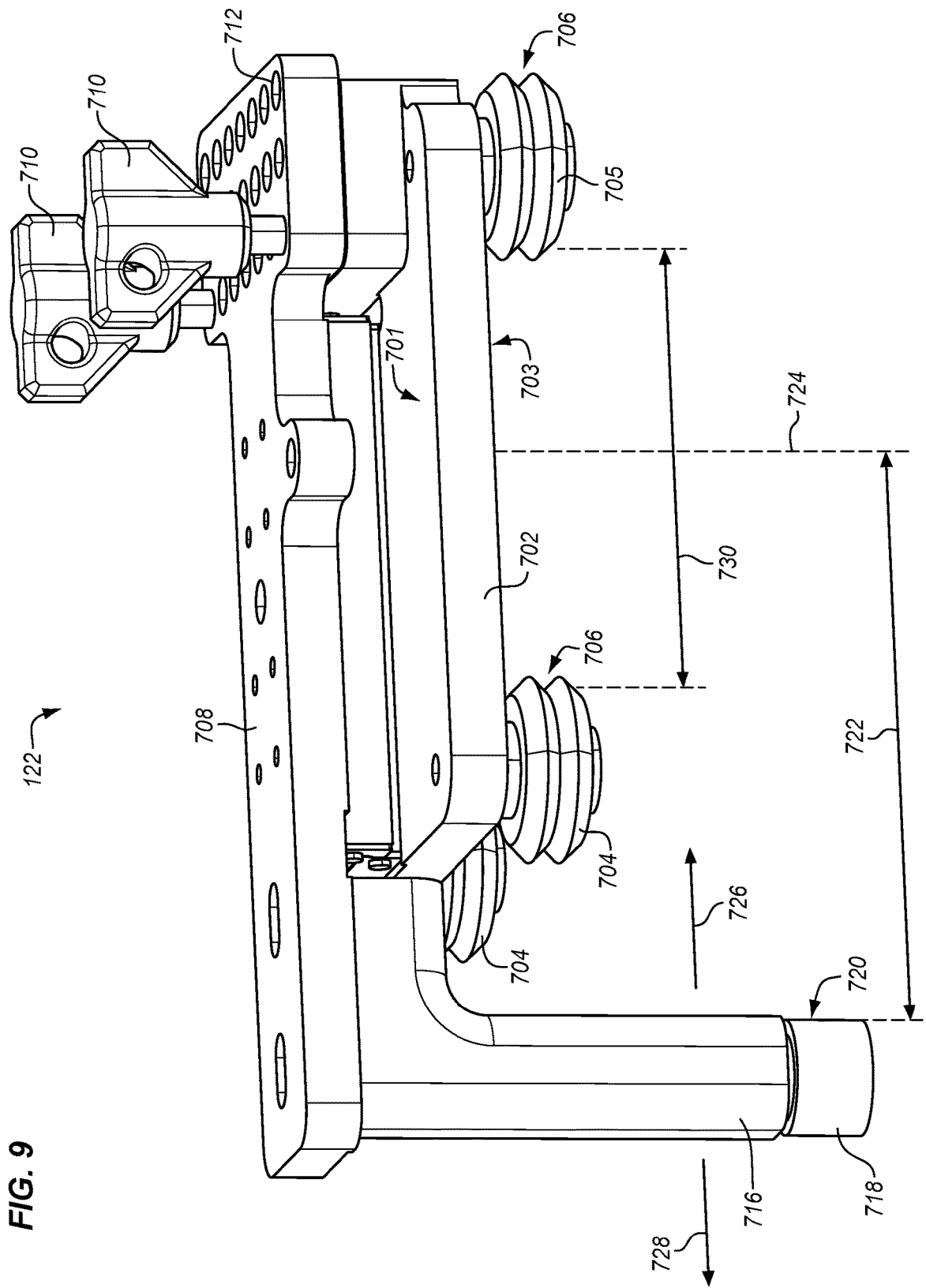

FIGS. 7-10 are isometric views of indexing cart 122 in an illustrative embodiment. FIG. 8 is an isometric view of indexing cart 122 along cut lines B-B depicted in FIG. 7.

In this embodiment, indexing cart 122 includes a base member 702 having a top surface 701 and an opposing bottom surface 703, each of which are substantially planar. Base member 702 includes a plurality of rollers 704-705 extending from bottom surface 703 and coupled to edges 414 of track 120. In particular, front rollers 704 are separated from back rollers 705 by a distance 730 (see FIG. 9) between rollers 704-705 that is defined by width 412 of track 120, such that grooves 706 in rollers 704-706 couple with edges 414 of track 120.

In this embodiment, an edge-engaging member 708 is movably coupled to base member 702 using one or more indexing pins 710 that are inserted into indexing holes 712 in top member 708. Edge-engaging member 708 includes a top surface 709 and an opposing bottom surface 711, each of which are substantially planar. Bottom surface 711 of edge-engaging member 708 is disposed towards top surface 701 of base member 702. Extending from bottom surface 711 of edge-engaging member 708 is an indexing guide 716, which includes a roller 718 that contacts edge 110 of fuselage segment 102 when indexing cart 122 is attached to track 120. However, indexing guide 716 may be coupled to edge-engaging member 708 differently in other embodiments.

Indexing pins 710 include a shaft 714 that extends through indexing holes 712 in edge-engaging member 708 and into receptacles 717 in base member 702 (see FIG. 8). Indexing holes 712 are drilled with offsets that modify a displacement of indexing guide 716 relative base member 702, thereby adjusting a position of roller 718 on indexing guide 716 that contacts edge 110 of fuselage segment 102. For example, moving indexing pins 710 between different indexing holes 712 moves indexing guide 716 in the directions of arrows 726-728 (see FIG. 9), such that a distance 722 between a contacting surface 720 of roller 718 and a centerline 724 between rollers 704-705 changes.

Generally, the offsets in indexing holes 712 are selected to allow for small adjustments in distance 722, such as five thousands of an inch, ten thousands of an inch, etc., in the relationship between a centerline 724 between rollers 704-705 of base member 702 and contacting surface 720 of roller 718. As the spatial relationship between base member 702 and track 120 is fixed based on rollers 704-705 (e.g., centerline 724 of base member 702 is half distance 730 between front rollers 704 and back rollers 705, and aligns with track centerline 418), these small adjustments modify how track 120 is aligned with edge 110 of fuselage segment 102. For example, since centerline 724 of base member 702 is aligned with track centerline 418, modifying distance 722 using indexing pins 710 moves track centerline 418 either closer to edge 110 (in the direction of arrow 728) or farther away from edge 110 (in the direction of arrow 726) at a location along track 120 where indexing carts 122 are positioned on track 120.

When a neutral position of indexing cart 122 is calibrated to a machining edge of processing tool 128, these type of small changes in distance 722 operate to allow processing tool 128 to machine a pre-defined amount of material from end 108 of fuselage segment 102 at a position where indexing carts 122 are loaded onto track 120. For instance, prior to installing indexing carts 122 on flexible track assembly 114, each of indexing carts 122 is calibrated to an edge of a blade for trim saw 128-1 such that a zero offset setting for indexing carts 122 corresponds to substantially no material being removed from edge 110 of fuselage segment 102 by trim saw 128-1 proximate to indexing carts 122 (e.g., the ends of the process line that process tool 128 operates on corresponds to edge 110 where indexing carts 122 previously aligned track 120 to edge 110). When indexing pins 710 are moved to different indexing holes 712, which represent a pre-defined change in distance 722, this activity orients the placement of track 120 relative to edge 110 such that, when tool cart 126 translates along track 120 between ends 124-125, the cutting blade of trim saw 128-1 follows a process line 736 (see FIG. 10) that is offset from edge 110 where indexing carts 122 are loaded onto track 120 in the direction of arrow 732 by a width 734. While width 734 is pre-set where indexing carts 122 are located on track 120, the amount of material removed from end 108 varies between indexing carts 122 depending on a distance between process line 736 and edge 110 (e.g., although edge 110 is depicted as linear and parallel to process line 736 in FIG. 10, edge 110 may have an arbitrary shape between indexing carts 122, even though process line 736 between indexing carts 122 is a straight line).

FIGS. 11-16 depict tool cart 126 in an illustrative embodiment. In this embodiment, tool cart 126 includes trim saw 128-1, which may be an off-the-shelf saw in some embodiments. In this embodiment, tool cart 126 includes a base member 1102 having a top surface 1101 and an opposing bottom surface 1103. Base member 1102 includes a plurality of rollers 1104-1105 extending from bottom surface 1103 that couple to edges 414 of track 120. In particular, front rollers 1104 are separated from back rollers 1105 by a distance 1114 between rollers 1104-1105 that is defined by width 412 of track 120, such that grooves 1106 in rollers 1104-1106 couple with edges 414 of track 120.

In this embodiment, tool cart 126 includes a handle 1108 coupled to base member 1102 that extends away from top surface 1101 of base member 1102. Handle 1108 allows an operator to translate tool cart 126 along track 120.

In this embodiment, tool cart 126 includes a release mechanism 1110, which modifies distance 1114 between rollers 1104-1105 to allow tool cart 126 to be placed at an arbitrary position along length 410 of track 120. For example, release mechanism 1110 may be operated to increase distance 1114 between front rollers 1104 and back rollers 1105, in order to disengage grooves 1106 of rollers 1104-1105 from edges 414 of track 120 and allow tool cart 126 to be removed from track 120. This process may also be reversed to install tool cart 126 onto track, with release mechanism 1110 being operated, once tool cart 126 is loaded onto track 120, to reduce distance 1114 between front rollers 1104 and rear rollers 1105 in order to lock tool cart 126 to track 120 as grooves 1106 in rollers 1104-1105 engage with edges 414 of track 120.

In this embodiment, tool cart 126 includes an ejection port 1112, which may be coupled to a vacuum system or chip collection system in order to capture debris generated by trim saw 128-1 as trim saw 128-1 cuts along process line 736 (see FIG. 10) of fuselage segment 102.

Tool cart 126 in this embodiment further includes a tool capture mechanism 1116, which pivots on axis 1120. Tool capture mechanism 1116 moves in the direction of arrows 1122-1123 in order to load or remove trim saw 128-1 to/from tool cart 126. For example, an operator may rotate tool capture mechanism 1116 in the direction of arrow 1123, mount trim saw 128-1 to tool capture mechanism 1116, and then rotate tool capture mechanism 1116 in the direction of arrow 1122 to secure trim saw 128-1 to tool cart 126. Thumb locks 1118-1119 may be used to prevent or allow the movement of tool capture mechanism 1116 in the direction of arrows 1122-1123. For instance, thumb lock 1119 may be used to hold tool capture mechanism 1116 partially open, while thumb lock 1118 may be used to secure tool capture mechanism 1116 in place when tool capture mechanism 1116 is fully closed (e.g., when tool capture mechanism 1116 moves fully in the direction of arrow 1122).

In this embodiment, a blade 1124 of trim saw 128-1 is fixed with respect to tool cart 126. More specifically, blade 1124 has a fixed distance 1126 from a centerline 1128 between front rollers 1104 and back rollers 1105. Centerline 1128 is located half of distance 1114 between front rollers 1104 and back rollers 1105, which places centerline 1128 at track centerline 418 of track 120 when tool cart 126 is attached to track 120. Thus, tool cart 126 has a fixed geometry between blade 1124 and track centerline 418 (e.g., distance 1126 is constant), and indexing cart 122 has a variable geometry between track centerline 418 and contact surface 720 of roller 718.

Figure 10:
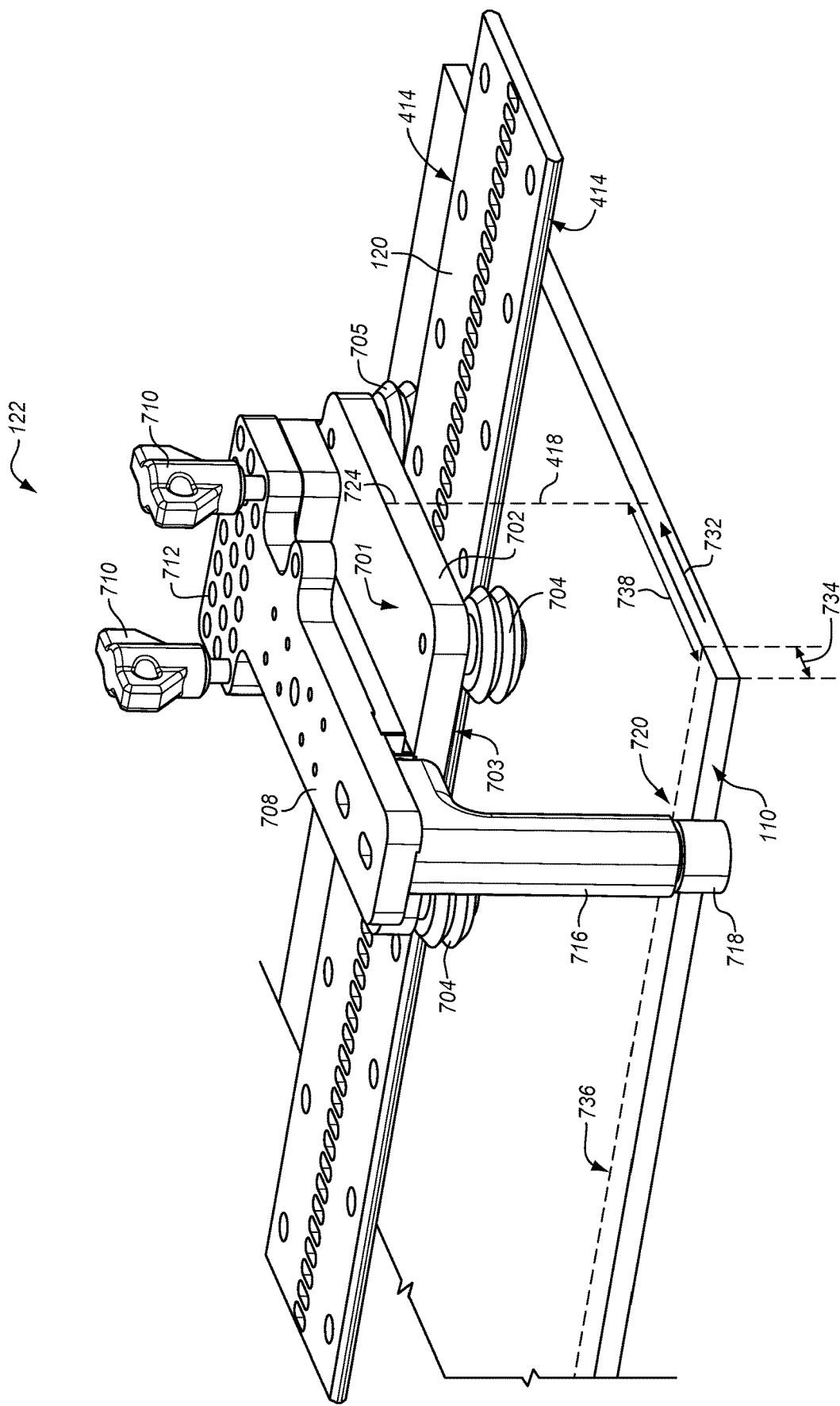
Figure 11:
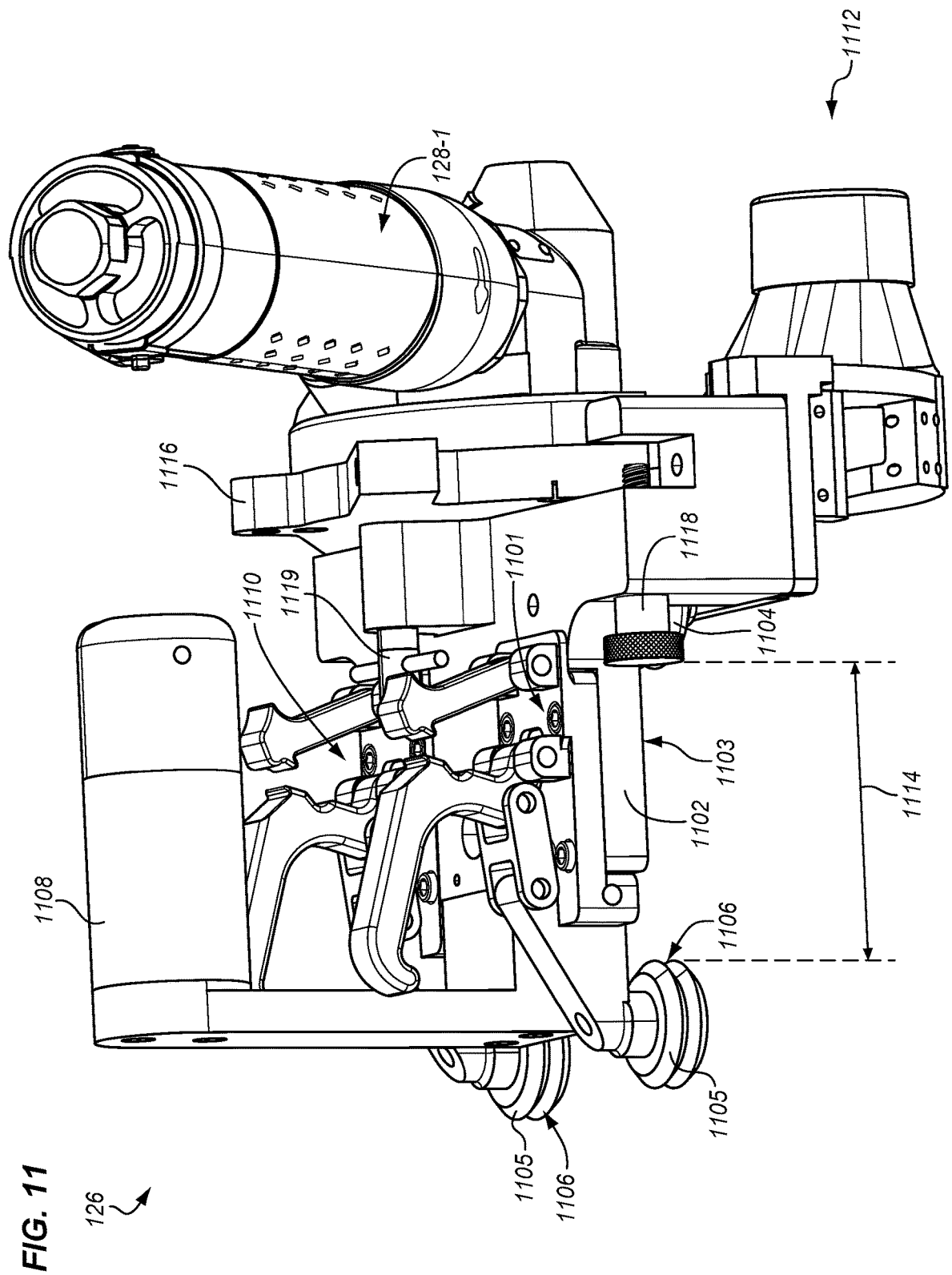
FIGS. 11-16 depict a tool cart in an illustrative embodiment.
Figure 12:
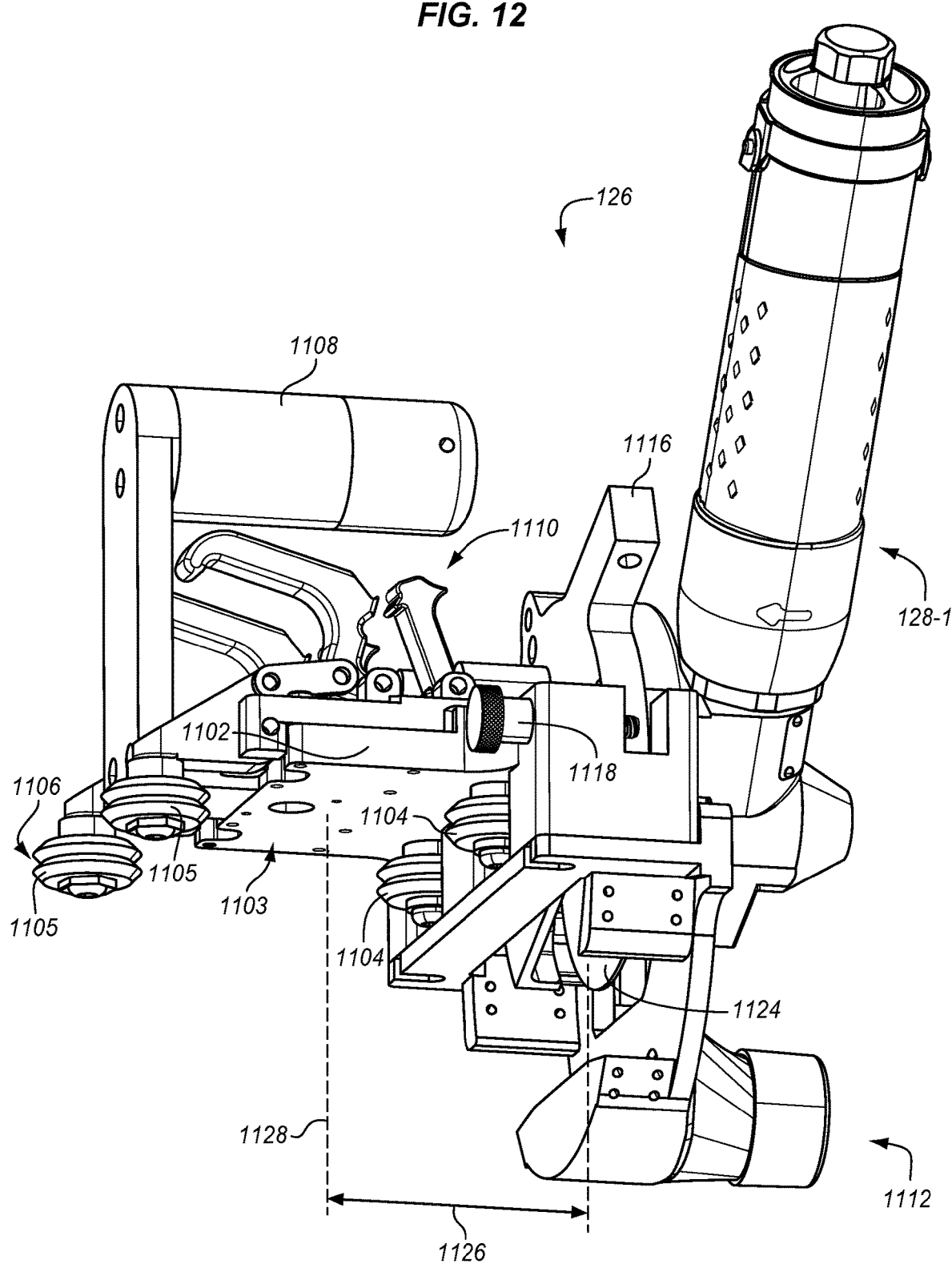
Figure 13:
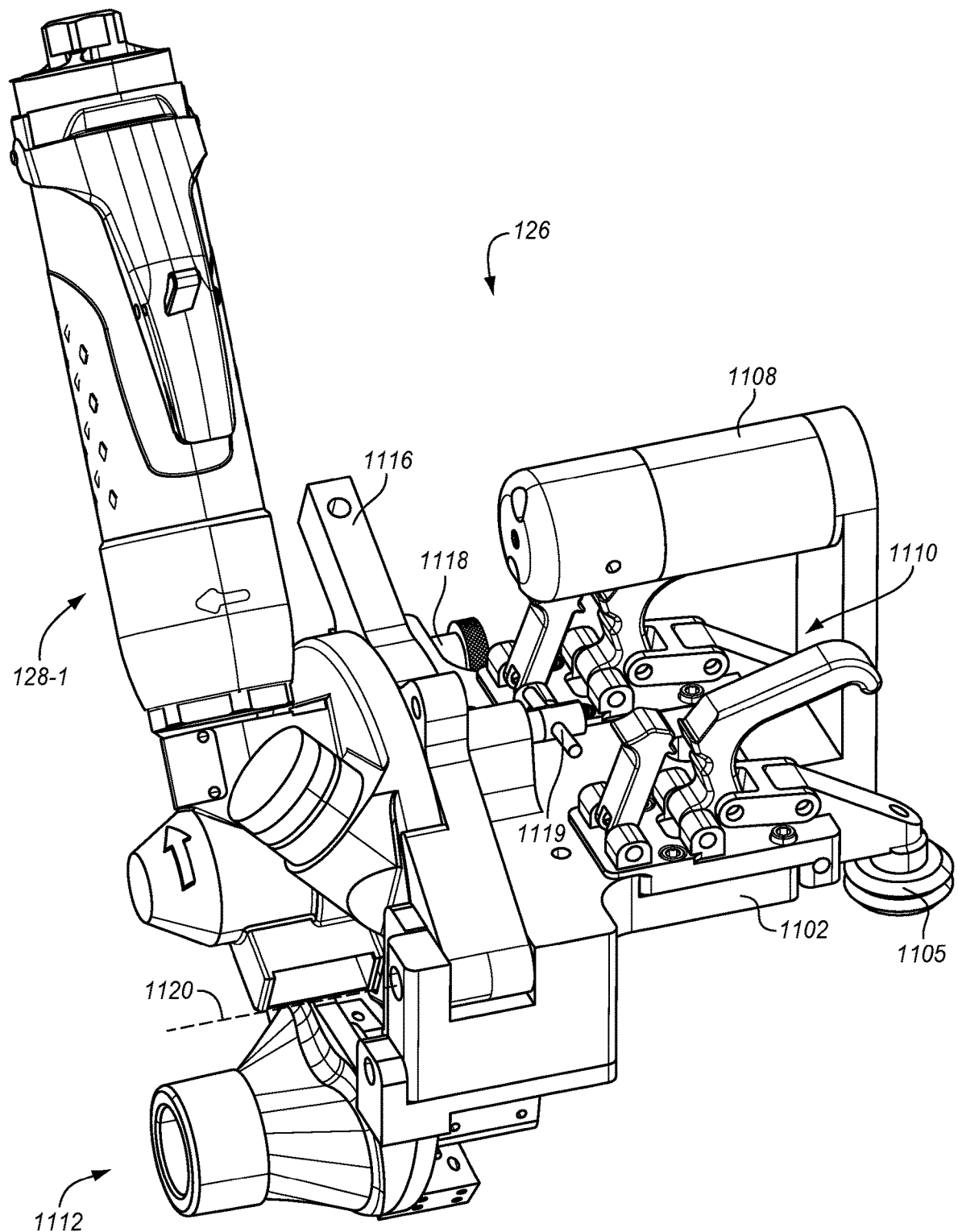
Figure 14:
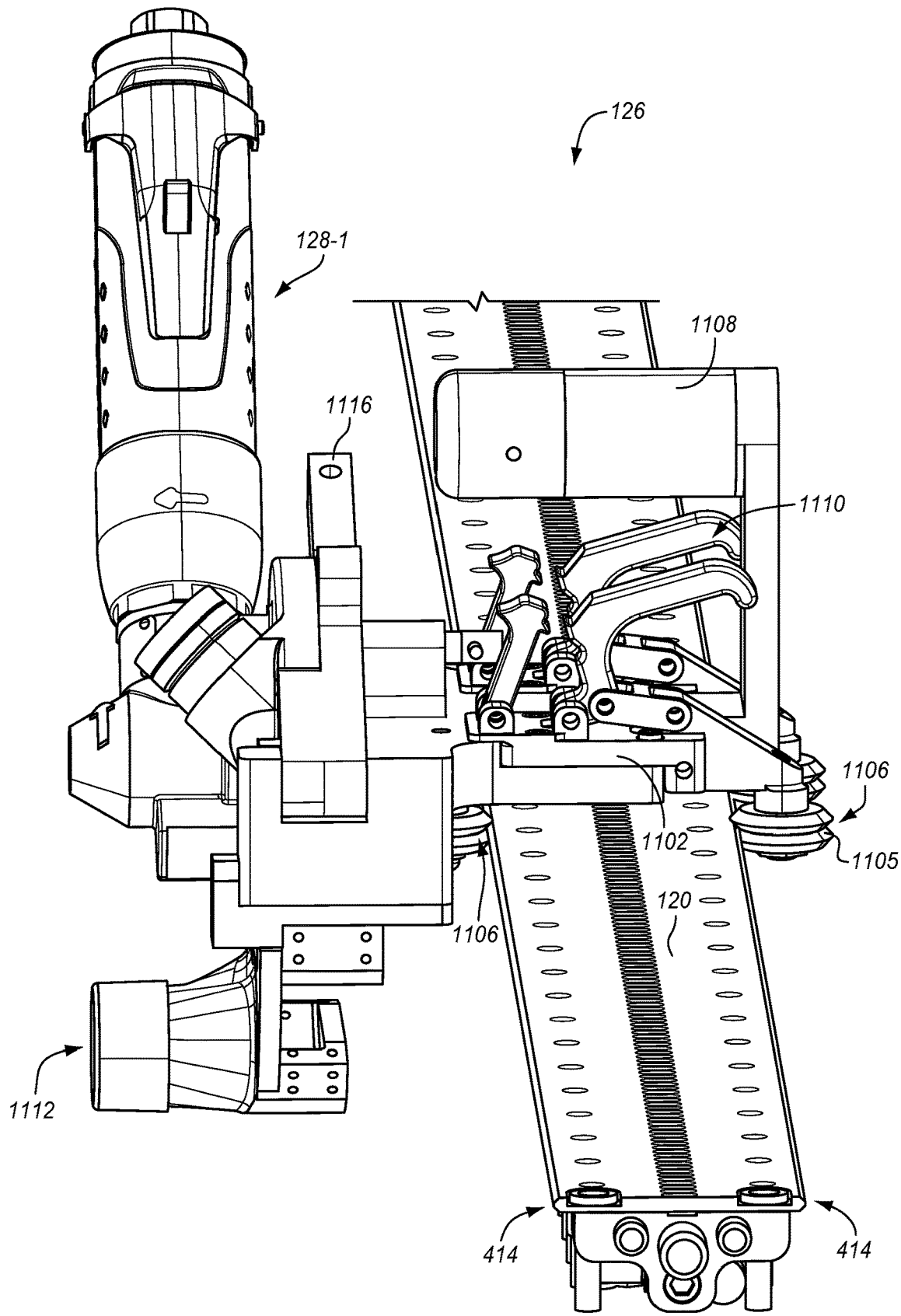
Figure 15:
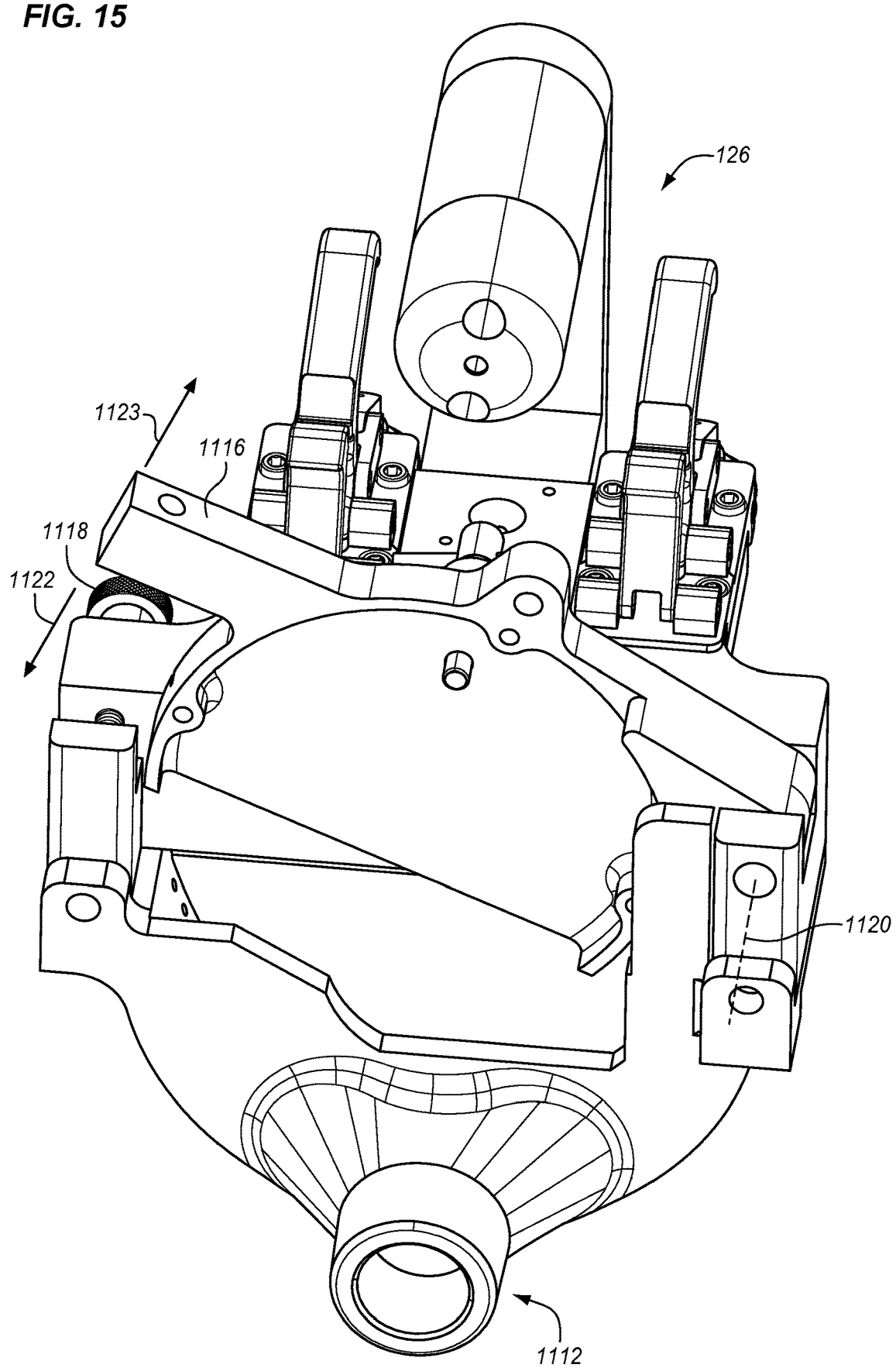
Figure 16:
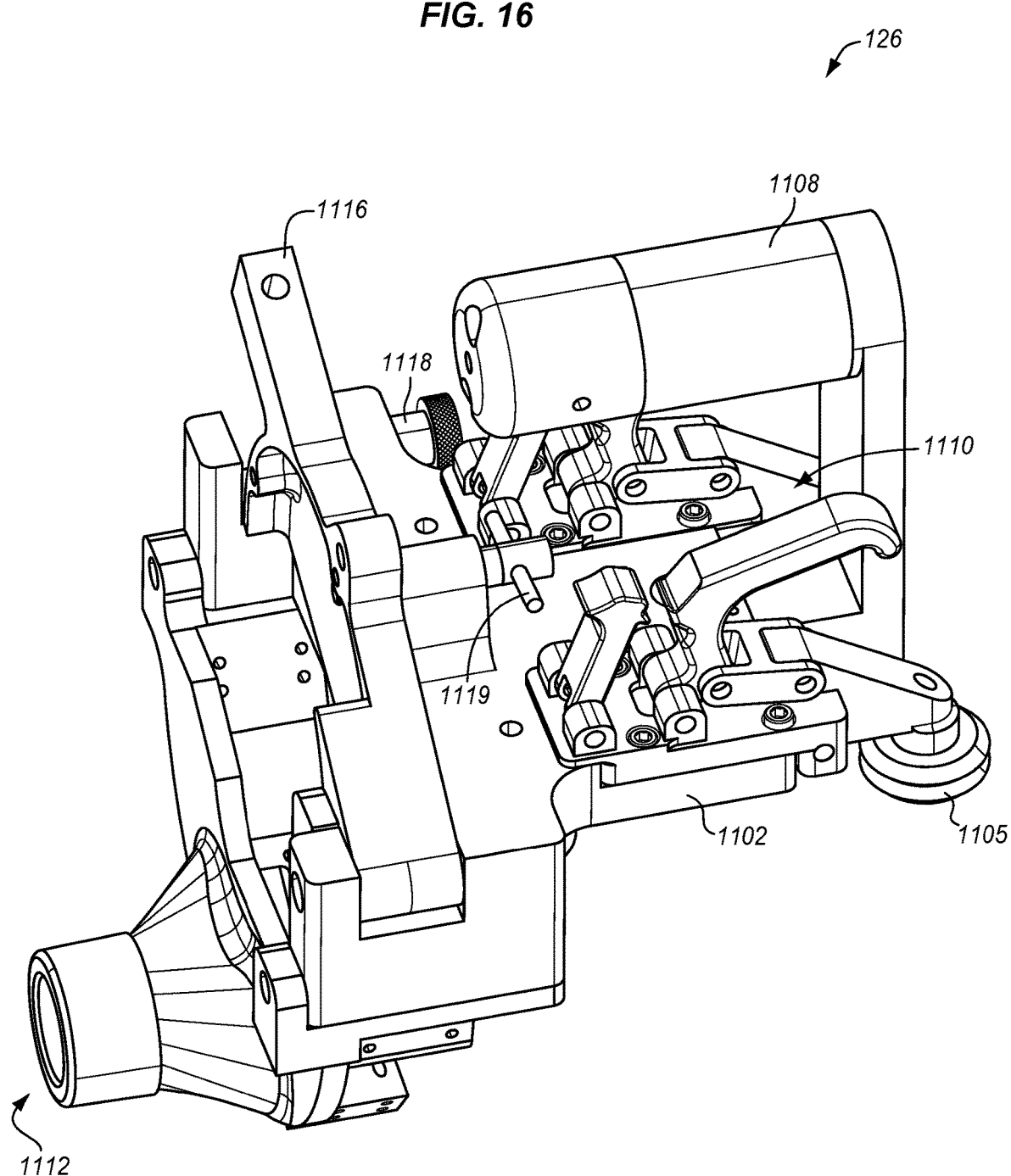

When indexing carts 122 are calibrated to tool cart 126, and are set to a zero offset, distance 722 on indexing cart between track centerline 418 and contact surface 720 of roller 718 is equal to distance 1126 between track centerline 418 and blade 1124 on trim saw 128-1. This configuration places blade 1124 at edge 110 proximate to indexing carts 122, and does not remove a substantial amount of material from end 108 of fuselage segment 102 (e.g., process line 736 is at edge 110, and width 734 is zero where indexing carts 122 are located on track 120). If indexing carts 122 are set to a fifteen thousands of an inch offset, then process line 736 would be positioned as shown in FIG. 10, with width 734 of material to remove at end 108 of fuselage segment 102 proximate to indexing cart 122 being fifteen thousands of an inch. In this configuration, distance 738 between track centerline 418 and process line 736 is equal to distance 1126 between blade 1124 and centerline 1128 of tool cart 126.

Figure 17:
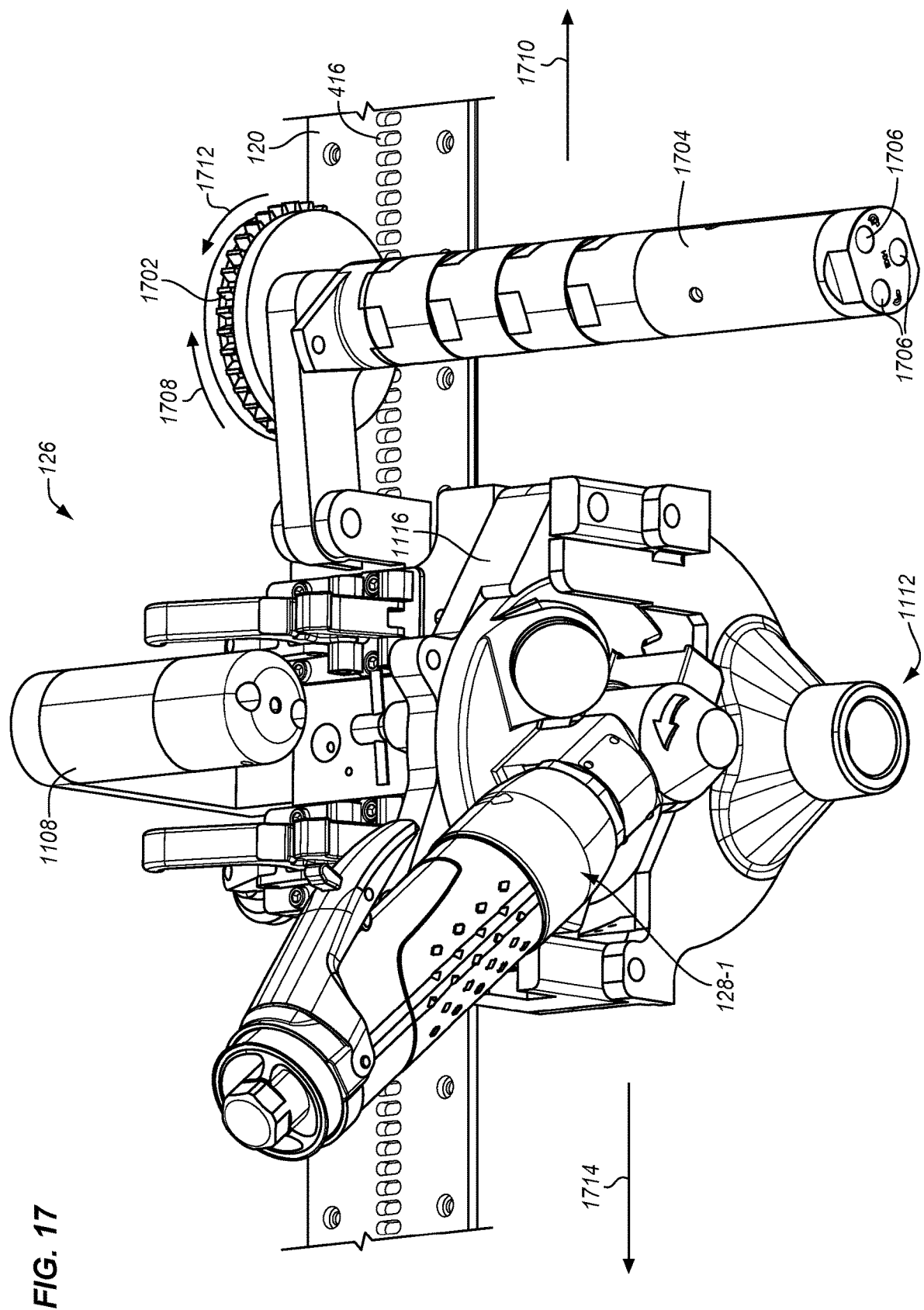
FIGS. 17-19 depict a tool cart in another illustrative embodiment.
Figure 18:
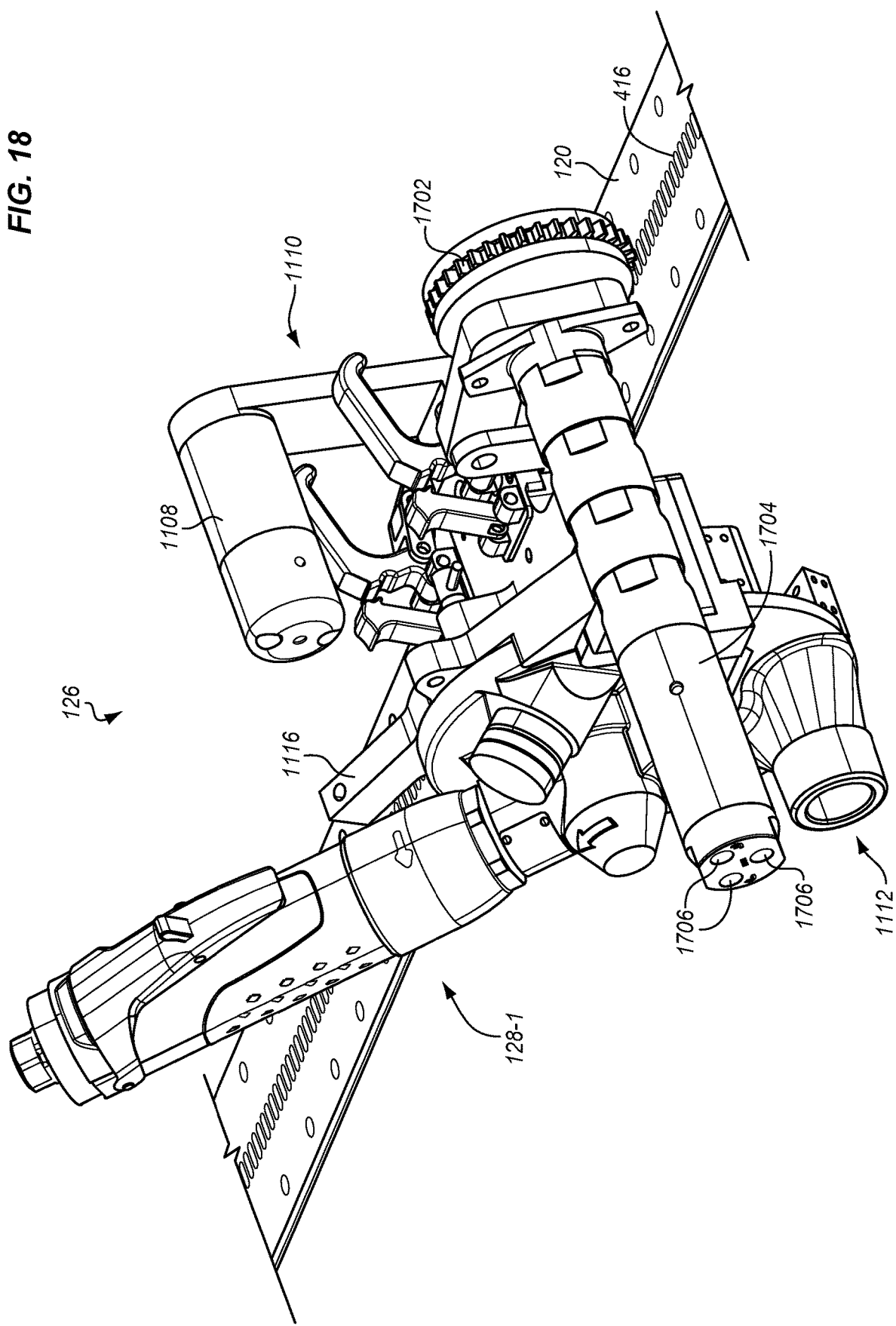
Figure 19:
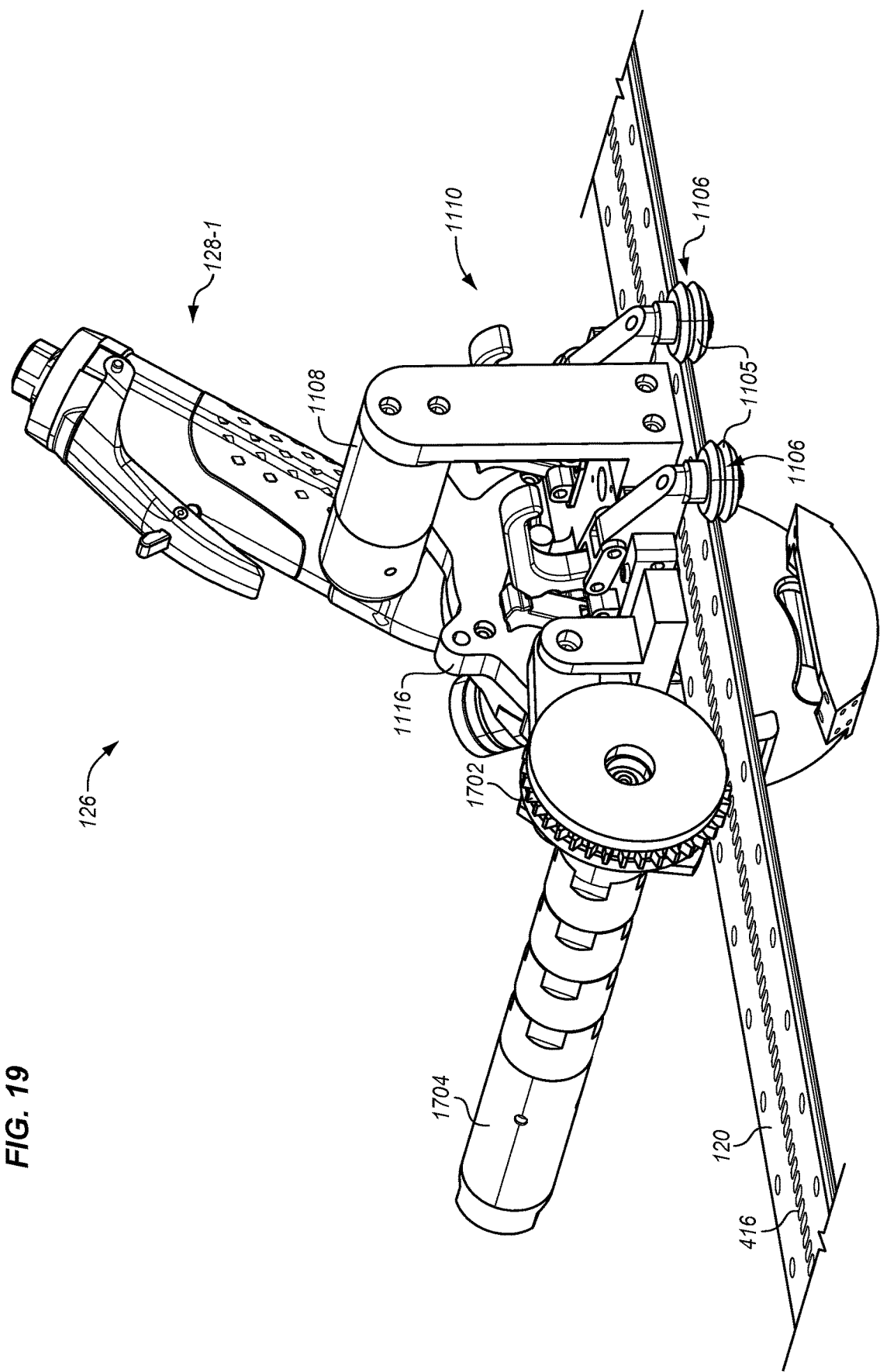

FIGS. 17-19 depict tool cart 126 in another illustrative embodiment. In this embodiment, tool cart 126 includes a drive gear 1702, which engages with gear guides 416 in track 120. Drive gear 1702 is mechanically driven by an air motor 1704, which includes a plurality of air ports 1706. Air ports 1706 may receive and/or discharge pressurized air, which provides the mechanical energy to operate air motor 1704. Drive gear 1702 rotates in the direction of arrow 1708 in order to propel tool cart 126 along track 120 in the direction of arrow 1710, and rotates in the direction of arrow 1712 in order to propel tool cart 126 along track 120 in the direction of arrow 1714.

Figure 20:
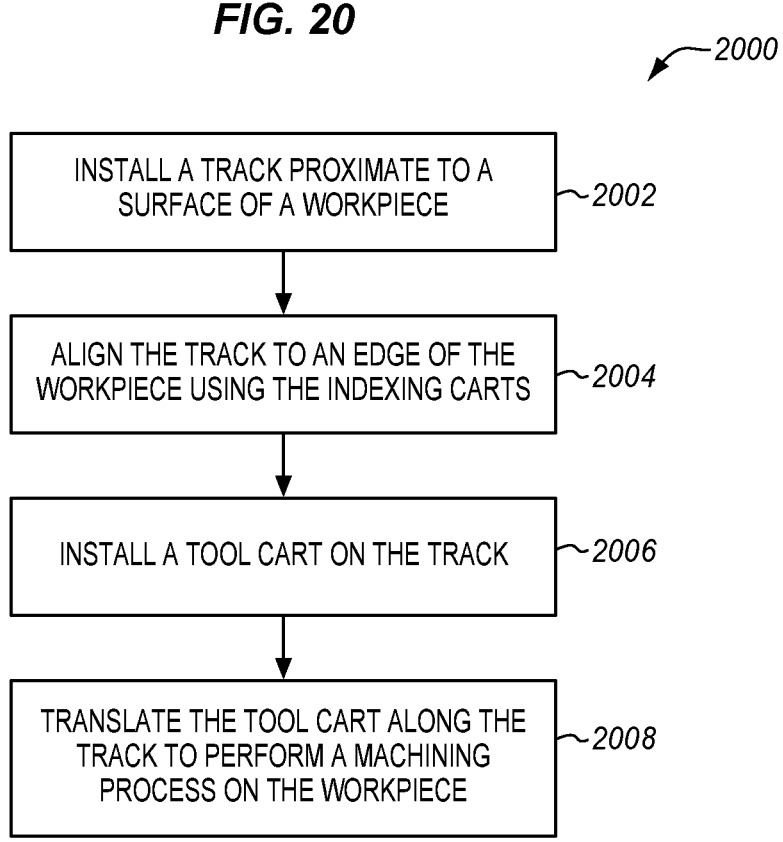
FIG. 20 is a method of operating a trim-tool assembly in an illustrative embodiment.
Figure 21:
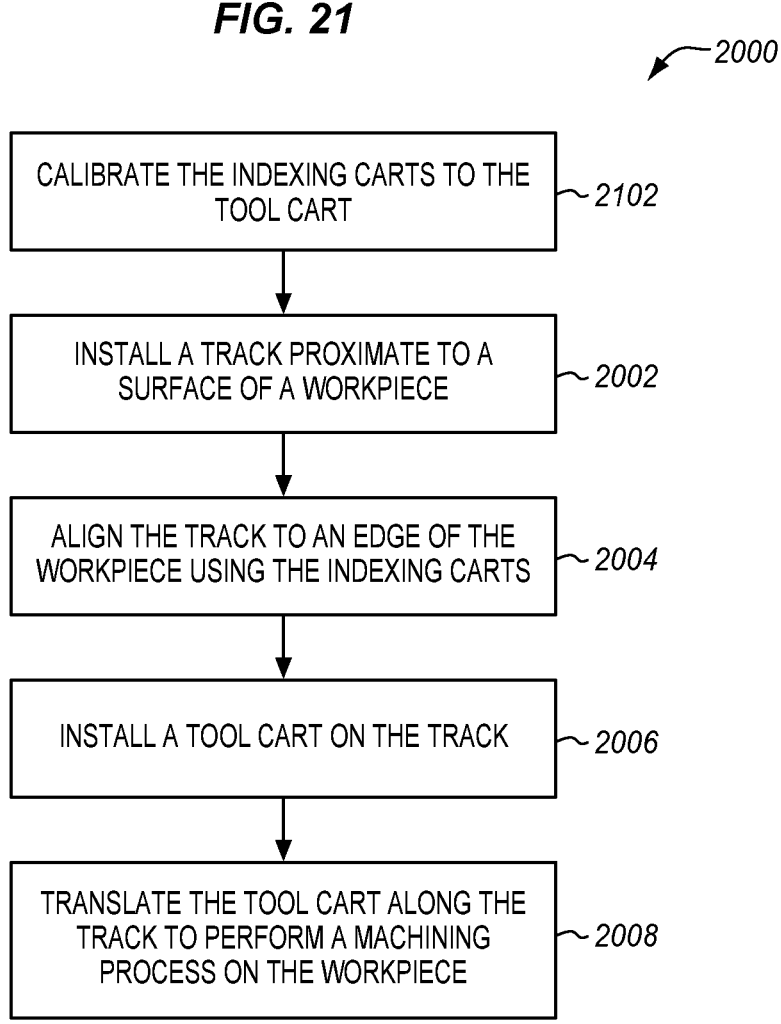
FIGS. 21-23 depict additional details of the method of FIG. 20 in illustrative embodiments.
Figure 22:
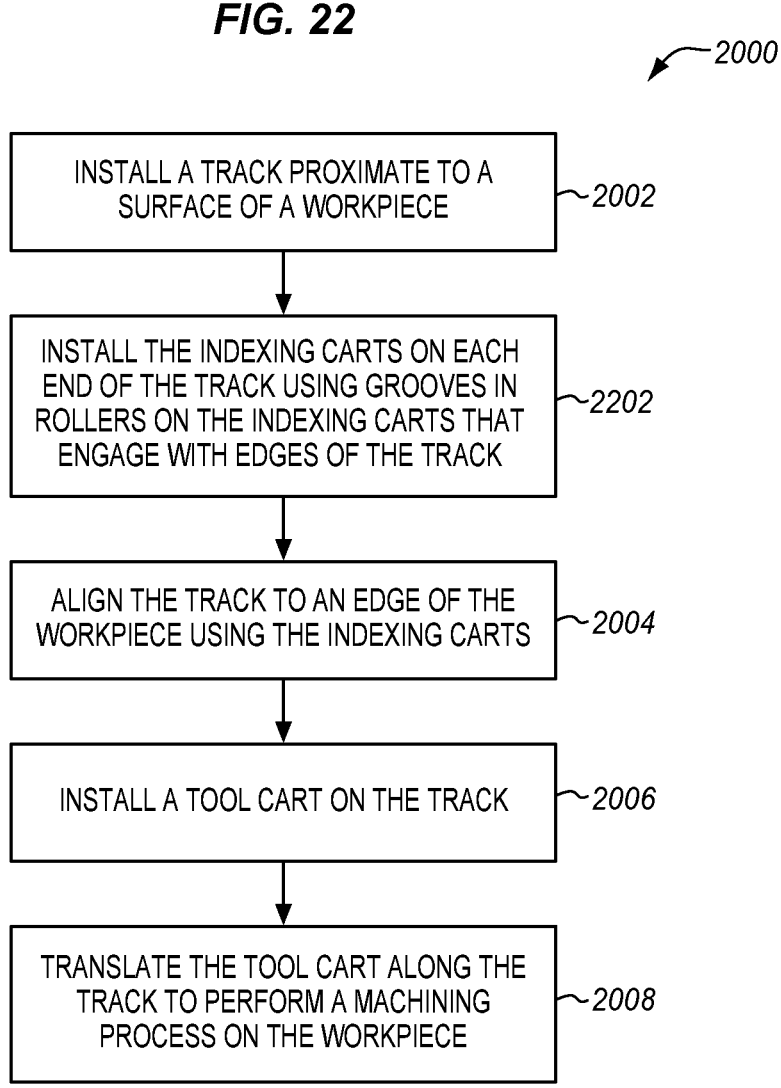
Figure 23:
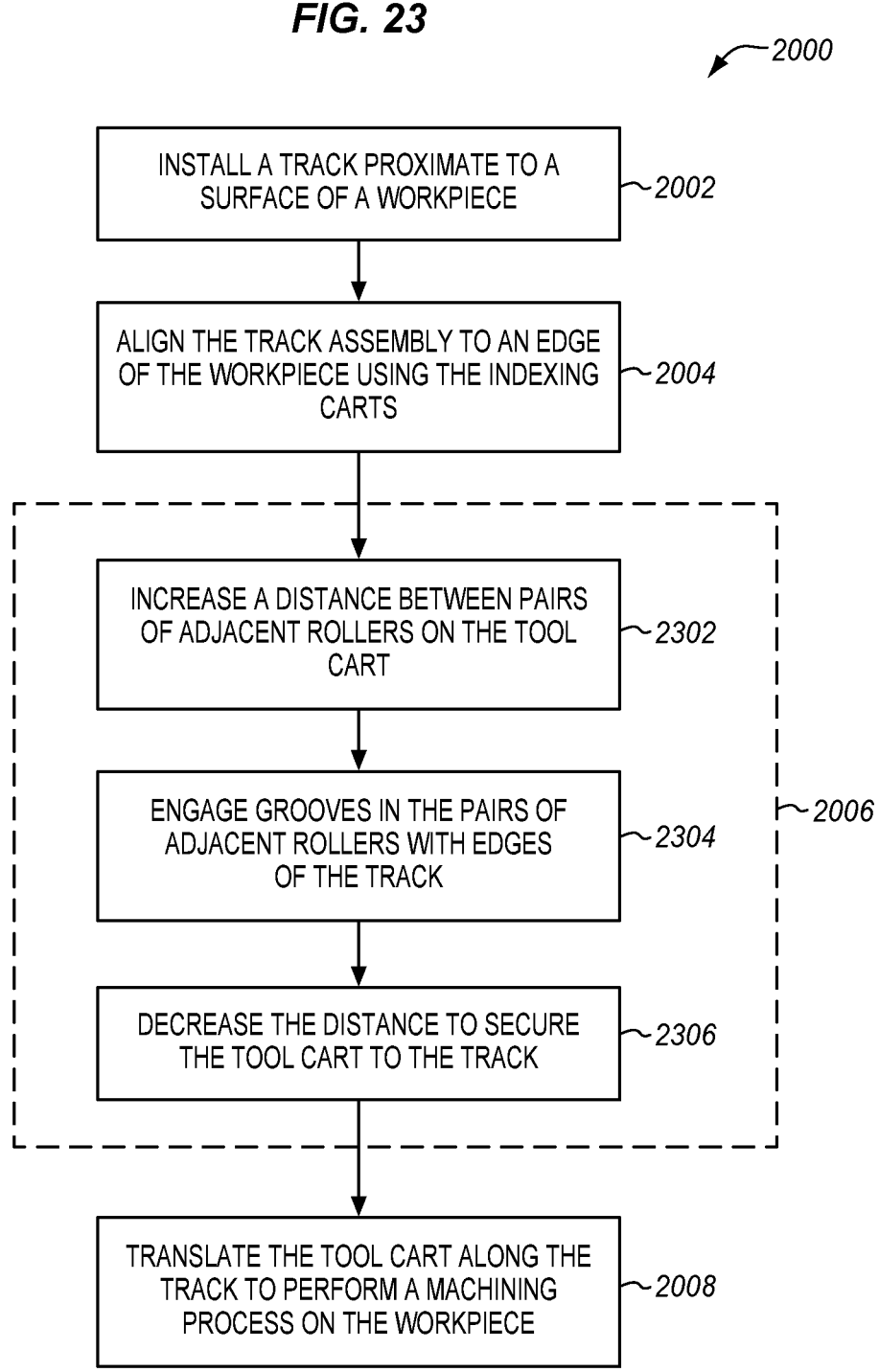

FIG. 20 is a method 2000 of operating a trim-tool assembly in an illustrative embodiment, and FIGS. 21-23 depict additional details of method 2000 in illustrative embodiments.

Method 2000 will be described with respect to trim-tool assembly 112 of FIGS. 1-19, although method 2000 may be performed by other systems, not shown. Method 2000 may include other steps, not shown. Further, the steps of method 2000 may be performed in an alternate order.

Step 2002 (see FIG. 20) comprises installing a track 120 proximate to outer surface 116 of workpiece 102. Step 2004 comprises aligning track 120 to edge 110 of workpiece 102 using indexing carts 122, where variable settings on indexing carts 122 define process line 736 that intersects workpiece 102 proximate to edge 110 between each of ends 124-125 of track 120. Step 2006 comprises installing tool cart 126 on track 120 that includes process tool 128 that performs a machining process along process line 736 based on the variable settings on indexing carts 122. Step 2008 comprises translating tool cart 126 along track 120 to perform the machining process along process line 736.

In an optional embodiment, step 2102 of method 2000 (see FIG. 21) comprises calibrating indexing carts 122 to tool cart 126 to identify a zero setting for the variable settings that places process line 736 at edge 110 of workpiece 102.

In an optional embodiment, indexing carts 122 are installed on track 120 at each of ends 124-125 using grooves 706 in rollers 704-705 on indexing carts 122 that engage with edges 414 of track 120 (see step 2202 of FIG. 22).

In an optional embodiment, installing tool cart 126 comprises increasing distance 1114 between pairs of adjacent rollers 1105-1106 on tool cart 126 to greater than width 412 of track 120 (see step 2302 of FIG. 23), engaging grooves 1106 in rollers 1104-1105 with edges 414 of track 120 (see step 2304), and decreasing distance 1114 to secure tool cart 126 to track 120 (see step 2306).

The use of trim-tool assembly 112 provides a number of technical benefits, including increased fabrication efficiency, decreased operator stress, reduced generation of foreign object debris in manufacturing environment 100, increased accuracy, among other benefits.

Figure 24:
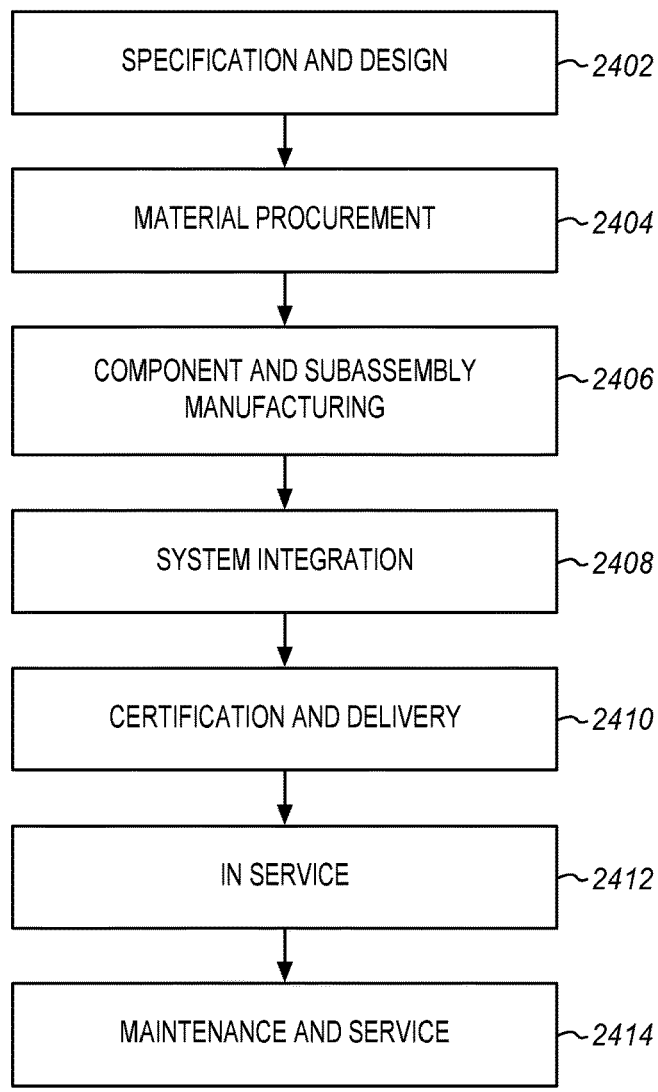
FIG. 24 is a flow chart illustrating an aircraft manufacturing and service method in an illustrative embodiment.
Figure 25:
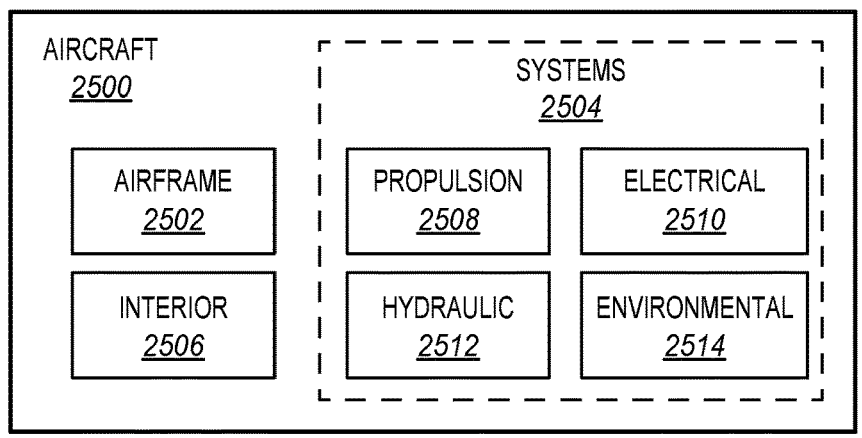
FIG. 25 is a schematic diagram of an aircraft in an illustrative embodiment.

The embodiments of the disclosure may be described in the context of an aircraft manufacturing and service method 2400 as shown in FIG. 24 and an aircraft 2500 as shown in FIG. 25. During pre-production, exemplary method 2400 may include a specification and design 2402 of aircraft 2500, and material procurement 2404. During production, component and subassembly manufacturing 2406 and system integration 2408 of aircraft 2500 takes place. Thereafter, aircraft 2500 may go through certification and delivery 2410 in order to be placed in service 2412. While in service by a customer, aircraft 2500 is scheduled for routine maintenance and service 2414 (which may also include modification, reconfiguration, refurbishment, and so on).

Each of the processes of service method 2400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 25, aircraft 2500 produced by exemplary method 2400 may include an airframe 2502 with a plurality of systems 2504 and an interior 2506. Examples of high-level systems 2504 include one or more of propulsion systems 2508, an electrical system 2510, a hydraulic system 2512, and an environmental system 2514. Any number of other systems may be included. Although an aerospace example is shown, the principles described in this specification may be applied to other industries, such as the automotive industry.

Apparatus and methods embodied herein may be employed during any one or more of the stages of the production and service method 2400. For example, components or subassemblies corresponding to process 2406 may be fabricated or manufactured in a manner similar to components or subassemblies produced while aircraft 2500 is in service. Also, one or more apparatus embodiments, method embodiments, or a combination thereof may be utilized during the component subassembly and manufacturing 2406 and system integration 2408, for example, by substantially expediting assembly of or reducing the cost of aircraft 2500. Similarly, one or more of apparatus embodiments, method embodiments, or a combination thereof may be utilized while aircraft 2500 is in service, for example and without limitation, to maintenance and service 2414.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A method of operating a trim-tool assembly, the method comprising:
prior to securing a track to a surface of a workpiece, aligning the track to an edge of the workpiece using indexing carts mounted on the track and disposed towards ends of the track, wherein variable settings on the indexing carts are configured to modify a position of the track relative to the edge of the workpiece to define a process line that intersects the workpiece;
installing a tool cart on the track that includes a process tool that performs a machining process along the process line defined by the variable settings on the indexing carts;
securing the track to the surface of the workpiece; and
after securing the track to the surface of the workpiece, performing the machining process along the process line by translating the tool cart along the track.

2. The method of claim 1, wherein:
the process tool comprises a trim saw; and
the machining process comprises using the trim saw to make a cut along the process line.

3. The method of claim 1, wherein:

the variable settings on the indexing carts define a width between the edge of the workpiece and the process line that is different at each of the indexing carts.

4. The method of claim 1, further comprising:
calibrating the indexing carts to the tool cart to identify a zero setting for the variable settings that places the process line at the edge of the workpiece at each of the indexing carts.

5. The method of claim 1, wherein:
the workpiece comprises one segment of a plurality of segments that comprise a fuselage for an aircraft.

6. The method of claim 1, wherein:
the indexing carts are mounted on the track using grooves in rollers on the indexing carts that engage with edges of the track.

7. The method of claim 1, wherein:
the variable settings on the indexing carts are configured to modify a distance between a contact surface on the indexing carts, that contacts the edge of the workpiece, and a centerline of the track.

8. The method of claim 1, further comprising:
removing the indexing carts from the track after the track is secured to the surface of the workpiece.

9. A trim-tool assembly configured to perform a machining process on a workpiece, the trim-tool assembly comprising:
a track configured to adhere to a surface of the workpiece;
a plurality of indexing carts mounted on the track and disposed towards ends of the track, each indexing cart of the indexing carts comprises:
a base member;
an edge-engaging member movably coupled to the base member; and
an indexing guide extending from the edge-engaging member and configured to contact an edge of the workpiece;
wherein variable settings on the indexing carts are configured to modify a position of the track relative to the edge of the workpiece prior to securing the track to the surface of the workpiece and to define a process line that intersects the workpiece; and
a tool cart disposed on the track and comprising a process tool configured to perform the machining process along the process line defined by the variable settings on the indexing carts as the tool cart translates along the track when the track is secured to the surface of the workpiece.

10. The trim-tool assembly of claim 9, wherein:
the process tool comprises a trim saw; and
the machining process comprises using the trim saw to make a cut along the process line.

11. The trim-tool assembly of claim 9, wherein:
the variable settings on the indexing carts are configured to define a width between the edge of the workpiece and the process line that is different at each of the indexing carts.

12. The trim-tool assembly of claim 9, wherein:
the indexing carts are calibrated to the tool cart to identify a zero setting for the variable settings that places the process line at the edge of the workpiece at the indexing carts.

13. The trim-tool assembly of claim 9, wherein:
the workpiece comprises one segment of a plurality of segments that comprise a fuselage for an aircraft.

14. The trim-tool assembly of claim 9, wherein:
the tool cart and the indexing carts include pairs of adjacent rollers with grooves that engage with edges of the track.

15. The trim-tool assembly of claim 9, wherein:
each indexing cart further comprises:
front rollers and back rollers extending from a bottom surface of the base member, and coupled with edges of the track;
wherein the front rollers are separated from the back rollers by a distance defined by a width of the track.

16. The trim-tool assembly of claim 15, wherein:
the edge-engaging member is movably coupled to the base member using one or more indexing pins that are inserted into indexing holes of the base member.

17. A trim-tool assembly configured to perform a machining process on a workpiece, the trim-tool assembly comprising:
a track;
a plurality of indexing carts mounted on the track, and configured to align the track to an edge of the workpiece;
each indexing cart of the indexing carts comprises:
a base member;
an edge-engaging member movably coupled to the base member; and
an indexing guide extending from the edge-engaging member and configured to contact the edge of the workpiece;
wherein a setting on each of the indexing carts is configured to adjust a distance between a centerline of the track and the edge of the workpiece prior to securing the track to a surface of the workpiece; and
a tool cart movably mounted to the track, the tool cart being translatable along the track when the track is secured to the surface of the workpiece, wherein the tool cart includes a process tool configured to perform the machining process on the workpiece at a fixed distance from the centerline of the track.

18. The trim-tool assembly of claim 17, wherein:
the process tool comprises a trim saw; and
the machining process comprises using the trim saw to make a cut through the workpiece at the fixed distance from the centerline of the track.

19. The trim-tool assembly of claim 17, wherein:
each indexing cart further comprises:
front rollers and back rollers extending from a bottom surface of the base member, and coupled with edges of the track;
wherein the front rollers are separated from the back rollers by a distance defined by a width of the track.

20. The trim-tool assembly of claim 19, wherein:
the edge-engaging member is movably coupled to the base member using one or more indexing pins that are inserted into indexing holes of the base member.

* * * * *